United States Patent
Kim et al.

(10) Patent No.: US 11,765,660 B2
(45) Date of Patent: Sep. 19, 2023

(54) METHOD AND APPARATUS FOR REDUCING POWER CONSUMPTION OF TERMINAL IN WIRELESS COMMUNICATION SYSTEM

(71) Applicant: Samsung Electronics Co., Ltd., Suwon-si (KR)

(72) Inventors: Taehyoung Kim, Suwon-si (KR); Youngbum Kim, Suwon-si (KR); Younsun Kim, Suwon-si (KR); Jeongho Yeo, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/048,560

(22) PCT Filed: Apr. 16, 2019

(86) PCT No.: PCT/KR2019/004567
§ 371 (c)(1),
(2) Date: Oct. 16, 2020

(87) PCT Pub. No.: WO2019/203530
PCT Pub. Date: Oct. 24, 2019

(65) Prior Publication Data
US 2021/0329556 A1    Oct. 21, 2021

(30) Foreign Application Priority Data
Apr. 16, 2018 (KR) .......................... 10-2018-0044119

(51) Int. Cl.
*H04W 52/02* (2009.01)
*H04W 8/24* (2009.01)

(52) U.S. Cl.
CPC ......... *H04W 52/0235* (2013.01); *H04W 8/24* (2013.01); *H04W 52/0229* (2013.01); *H04W 52/0251* (2013.01)

(58) Field of Classification Search
CPC .............. H04W 8/24; H04W 52/0229; H04W 52/0235; H04W 52/0251; H04W 52/146;
(Continued)

(56) References Cited

U.S. PATENT DOCUMENTS

2007/0057767 A1    3/2007   Sun et al.
2010/0248718 A1    9/2010   Kim
(Continued)

FOREIGN PATENT DOCUMENTS

KR         10-0411902 B1       12/2003
KR       10-2010-0107822 A     10/2010
(Continued)

OTHER PUBLICATIONS

Supplementary European Search Report dated Apr. 23, 2021, in connection with European Patent Application No. 19788011.5, 8 pages.
(Continued)

*Primary Examiner* — Ricardo H Castaneyra

(57) ABSTRACT

The disclosure relates to a method and apparatus for reducing power consumption of a terminal in a wireless communication system, and an operation method of a terminal for reducing power consumption of the terminal in a wireless communication system according to an embodiment of the disclosure includes transmitting a power saving mode request (PSR) message requesting a power saving mode to a base station and receiving configuration information or indicator information relating to the power saving mode from the base station.

20 Claims, 14 Drawing Sheets

(58) Field of Classification Search
CPC ......... H04W 52/0261; H04W 52/0209; H04W 72/20; Y02D 30/70
See application file for complete search history.

(56) References Cited

U.S. PATENT DOCUMENTS

| | | | |
|---|---|---|---|
| 2012/0201182 | A1 | 8/2012 | Kwon et al. |
| 2013/0265922 | A1 | 10/2013 | Chakravarthy et al. |
| 2015/0223165 | A1 | 8/2015 | Xu |
| 2017/0265171 | A1 | 9/2017 | Rico Alvarino et al. |
| 2018/0191413 | A1* | 7/2018 | Suzuki ............... H04L 5/0053 |
| 2019/0182702 | A1* | 6/2019 | Wang ............... H04W 28/0221 |
| 2019/0281545 | A1* | 9/2019 | Kim ............... H04W 52/0216 |
| 2019/0281598 | A1* | 9/2019 | Almalfouh ........ H04W 72/0446 |

FOREIGN PATENT DOCUMENTS

| | | |
|---|---|---|
| KR | 10-2012-0120108 A | 11/2012 |
| WO | 2014070321 A1 | 5/2014 |

OTHER PUBLICATIONS

Samsung, "UE Assistance information for energy efficiency", 3GPP TSG-RAN WG2 Meeting #98, R2-1705609, Hangzhou, China, May 15-19, 2017, 2 pages.

Intel Corp., "On MIMO layer adaptation", 3GPP TSG RAN WG1 NR Ad-Hoc meeting, R1-1700340, Spokane, USA, Jan. 16-20, 2017, 2 pages.

Ericsson, "UE overheating indication", 3GPP TSG-RAN WG2 Meeting #99 , Tdoc R2-1709536, Berlin, Germany, Aug. 21-25, 2017, 2 pages.

Intel Corp., "Remaining details on CW-to-MIMO layer mapping", 3GPP TSG RAN WG1 NR Ad-Hoc#2, R1-1710517, Qingdao, P.R. China, Jun. 27-30, 2017, 6 pages.

Apple et al., "Stage 2 CR on FeMTC UE CE mode and maximum PDSCH/PUSCH BW preference", 3GPP TSG-RAN WG2 Meeting #97, R2-1702333, Athens, Greece, Feb. 13-17, 2017, 2 pages.

International Search Report and Written Opinion of the International Searching Authority in connection with International Application No. PCT/KR2019/004567 dated Aug. 5, 2019, 11 pages.

Qualcomm Inc, "UE Power Saving during Active State," R2-1711904, 3GPP TSG RAN WG2 NR #99bis, Prague, Czech, Oct. 9-13, 2017, 9 pages.

Korean Intellectual Property Office, "Notice of Allowance," dated Aug. 3, 2022, in connection with Korean Patent Application No. 10-2018-0044119, 4 pages.

Qualcomm Incorporated, "UE Power Saving during Active State," 3GPP TSG RAN WG2 NR #99bis, R2-1711904, Prague, Czech, Oct. 9-13, 2017, 9 pages.

European Patent Office, "Communication pursuant to Article 94(3) EPC," dated Feb. 1, 2023, in connection with European Patent Application No. 19788011.5, 5 pages.

\* cited by examiner

FIG. 11
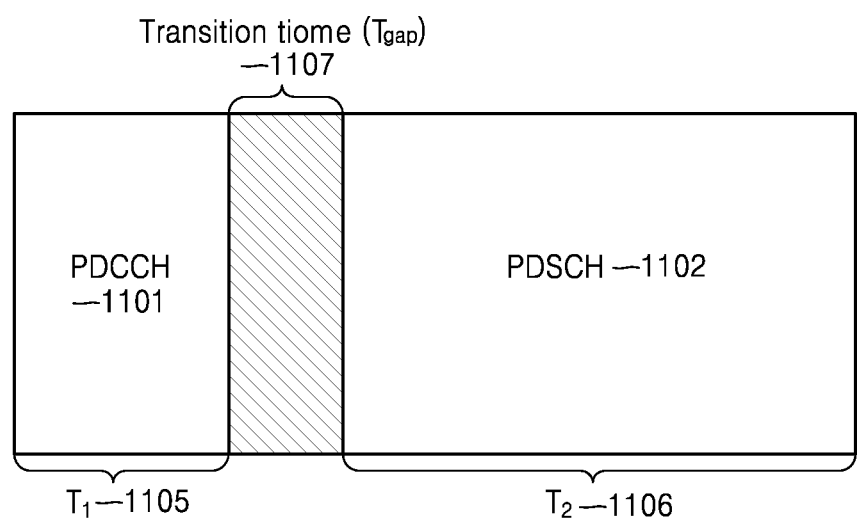
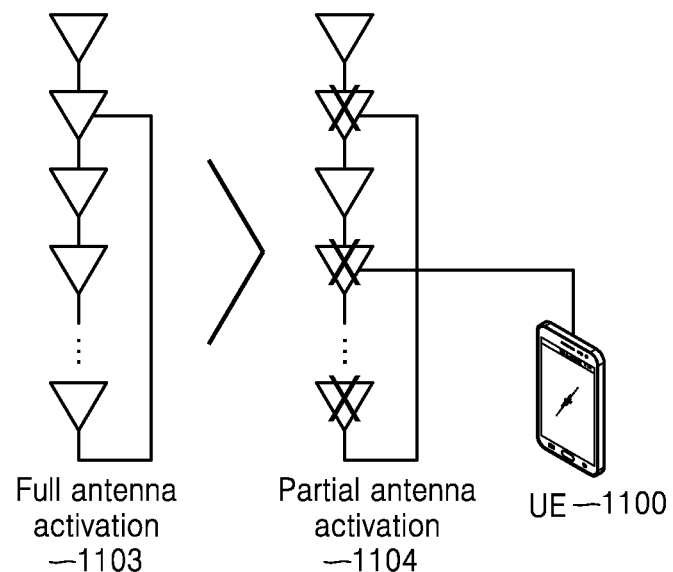

METHOD AND APPARATUS FOR REDUCING POWER CONSUMPTION OF TERMINAL IN WIRELESS COMMUNICATION SYSTEM

CROSS-REFERENCE TO RELATED APPLICATIONS

This application is a 371 National Stage of International Application No. PCT/KR2019/004567, filed Apr. 16, 2019, which claims priority to Korean Patent Application No. 10-2018-0044119, filed Apr. 16, 2018, the disclosures of which are herein incorporated by reference in their entirety.

BACKGROUND

1. Field

The disclosure relates to a method and apparatus for reducing power consumption of a terminal in a wireless communication system.

2. Description of Related Art

To meet demand due to ever-increasing wireless data traffic since commercialization of the $4^{th}$ (4G) communication system, there have been efforts to develop an advanced $5^{th}$ generation (5G) system or pre-5G communication system. For this reason, the 5G or pre-5G communication system is also called a beyond 4th-generation (4G) network communication system or post long term evolution (LTE) system. Implementation of the 5G communication system using ultra-frequency (millimeter wave (mmWave)) bands, e.g., 60 giga hertz (GHz) bands, is considered to attain higher data rates. To reduce propagation loss of radio waves and increase a transmission range of radio waves in the ultra-frequency bands, beamforming, massive multiple-input multiple-output (massive MIMO), full dimensional MIMO (FD-MIMO), array antenna, analog beamforming, large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) modulation (FQAM), sliding window superposition coding (SWSC), and an advanced access technology, e.g., filter bank multi carrier (FBMC), non-orthogonal multiple access (NOMA), sparse code multiple access (SCMA) are being developed.

In the meantime, the Internet is evolving from a human-oriented connectivity network where humans generate and consume information to an Internet of Things (IoT) network where distributed entities or things send, receive and process information without human intervention. Internet of Everything (IoE) technologies, in which a big data processing technology through connection with a cloud server, for example, are combined with the IoT technology, have also emerged. To implement IoT, various technologies, such as sensing technology, wired/wireless communication and network infrastructure, service interfacing technology, and security technology are required, and recently, even technologies for sensor network, Machine to Machine (M2M), Machine Type Communication (MTC) for connection between things are being studied. In the IoT environment, intelligent Internet Technology (IT) services that create new values for human life by collecting and analyzing data generated from connected things may be provided. IoT may be applied to a variety of areas, such as smart home, smart building, smart city, smart car or connected car, smart grid, health care, smart home appliances and advanced medical services through convergence and combination between existing Information Technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, and array antenna schemes, etc. Even application of a cloud Radio Access Network (cloud RAN) as the aforementioned big data processing technology may be said as an example of convergence of 5G and IoT technologies.

With the development of the aforementioned technologies and mobile communication systems, it is possible to provide various services, and there is a need for a method to provide the services effectively.

SUMMARY

Embodiments of the disclosure provide an apparatus and method for effectively providing a service in a mobile communication system.

The disclosure relates to a method and apparatus for reducing power consumption of a terminal in a wireless communication system, and an operation method, performed by a terminal, for reducing power consumption of the terminal in a wireless communication system according to an embodiment of the disclosure includes transmitting a power saving mode request (PSR) message requesting a power saving mode to a base station and receiving configuration information or indicator information relating to the power saving mode from the base station.

According to embodiments of the disclosure, services may be effectively provided in a mobile communication system.

BRIEF DESCRIPTION OF THE DRAWINGS

FIG. 11 illustrates how to reduce power consumption of a terminal in a wireless communication system, according to another embodiment.

DETAILED DESCRIPTION

Figure 1:
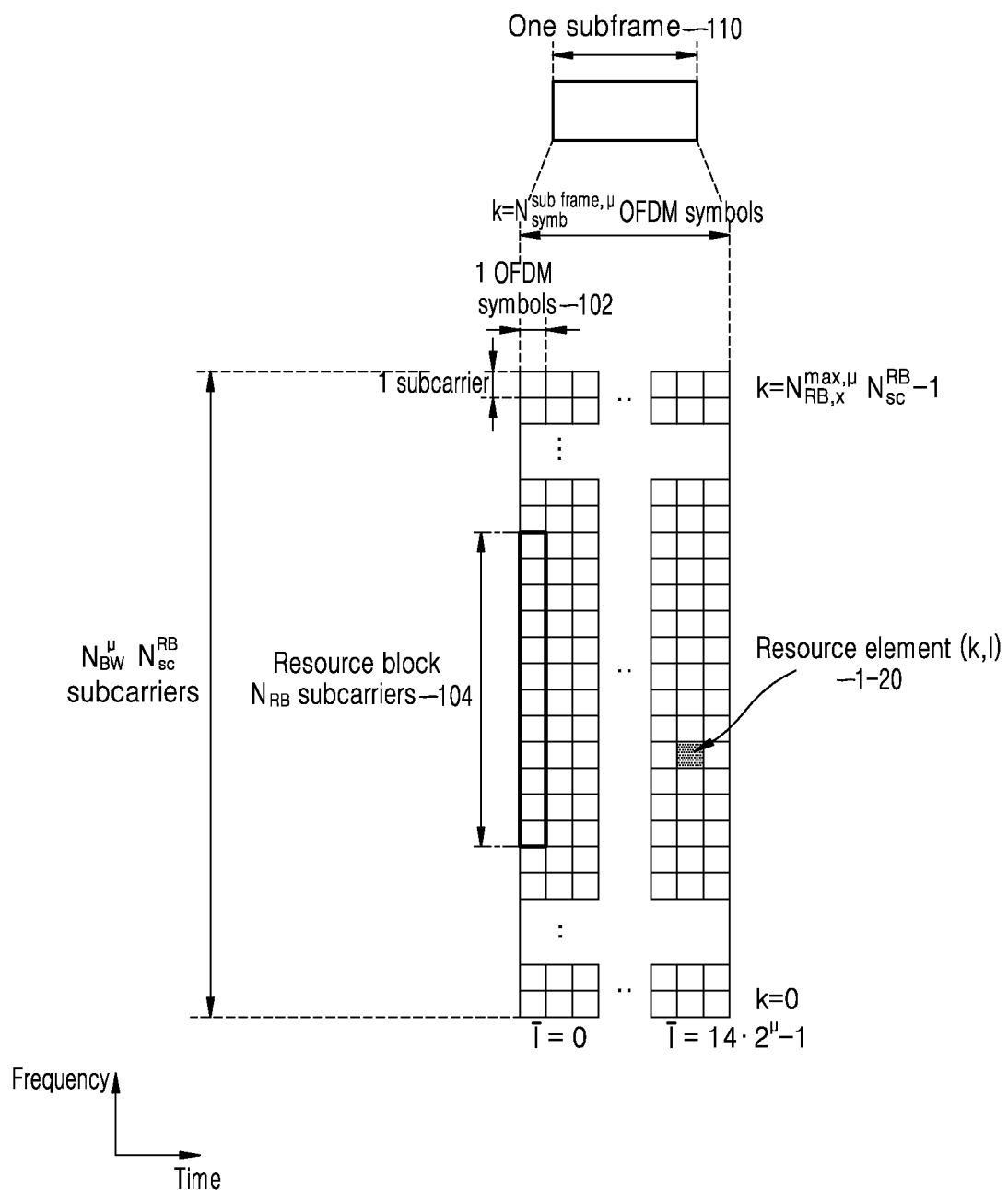
FIG. 1 illustrates a basic structure of the time-frequency domain, which is a radio resource region of a $5^{th}$ generation (5G) or New Radio (NR) system.

According to an embodiment, an operation method, performed by a terminal, for reducing power consumption of the terminal in a wireless communication system includes transmitting a power saving mode request (PSR) message requesting a power saving mode to a base station and receiving configuration information or indicator information relating to the power saving mode from the base station.

In an embodiment, the PSR message may include at least one or more of a power saving mode request indicator, a maximum bandwidth for a bandwidth part, a minimum value of a physical downlink control channel (PDCCH) monitoring periodicity, a maximum value of a number of PDCCH candidates, and a maximum value of a number of layers.

In an embodiment, the transmitting of the PSR message requesting the power saving mode to the base station may include transmitting the PSR message to the base station through at least one or more signaling among higher layer signaling or L1 signaling.

In an embodiment, the L1 signaling may include at least one or more of a physical uplink control channel (PUCCH), a physical uplink shared channel (PUSCH), or a dedicated physical layer channel for transmitting the PSR message.

In an embodiment, the receiving of the configuration information or the indicator information relating to the power saving mode from the base station may include receiving the configuration information relating to the power saving mode through higher layer signaling, and receiving the indicator information relating to the power saving mode through L1 signaling.

In an embodiment, the configuration information relating to the power saving mode may include at least one or more of a bandwidth part, a PDCCH monitoring periodicity, a number of PDCCH candidates, and a number of layers.

In an embodiment, the indicator information relating to the power saving mode may include at least one or more of a change in a bandwidth part and a change in a number of layers.

In an embodiment, the method may further include transmitting a power saving mode release request (PSR2) message requesting release of the power saving mode to the base station.

According to another embodiment, an operation method, performed by a base station, for reducing power consumption of a terminal in a wireless communication system includes receiving a PSR message requesting a power saving mode from the terminal, and transmitting configuration information or indicator information relating to the power saving mode to the terminal in response to the PSR message.

In an embodiment, the PSR message may include at least one or more of a power saving mode request indicator, a maximum bandwidth for a bandwidth part, a minimum value of a PDCCH monitoring periodicity, a maximum value of a number of PDCCH candidates, and a maximum value of a number of layers.

In an embodiment, the receiving of the PSR message requesting the power saving mode from the terminal may include receiving the PSR message from the terminal through at least one or more signaling among higher layer signaling or L1 signaling.

In an embodiment, the L1 signaling may include at least one or more of a PUCCH, a PUSCH, and a dedicated physical layer channel for transmitting the PSR message.

In an embodiment, the transmitting of the configuration information or the indicator information relating to the power saving mode to the terminal in response to the PSR message may include transmitting the configuration information relating to the power saving mode through higher layer signaling, and transmitting the indicator information relating to the power saving mode through L1 signaling.

In an embodiment, the configuration information relating to the power saving mode may include at least one or more of a bandwidth part, a PDCCH monitoring periodicity, a number of PDCCH candidates, and a number of layers.

In an embodiment, the indicator information relating to the power saving mode may include at least one or more of a change in a bandwidth part and a change in a number of layers.

In an embodiment, the operation method may further include receiving a PSR2 message requesting release of the power saving mode from the terminal and freely operating parameters related to data transmission or reception, in response to the PSR2 message.

According to another embodiment, a terminal for reducing power consumption in a wireless communication system includes a transceiver, at least one or more memories storing a program for reducing power consumption, and at least one or more processors configured to execute the program to control a PSR message requesting a power saving mode to be transmitted to a base station, and configuration information or indicator information relating to the power saving mode to be received from the base station.

According to another embodiment, a base station for reducing power consumption of a terminal in a wireless communication system includes a transceiver, at least one or more memories storing a program for reducing power consumption, and at least one or more processors configured to execute the program to control a PSR message requesting a power saving mode to be received from the terminal, and configuration information or indicator information relating to the power saving mode to be transmitted to the terminal, in response to the PSR message.

According to another embodiment, an operation method, performed by a terminal, for reducing power consumption of the terminal in a wireless communication system includes receiving configuration information about a maximum number of layers or a maximum number of DMRS ports for a PDSCH from a base station, and activating antennas based on the maximum number of layers or the maximum number of DMRS ports.

In an embodiment, the configuration information about the maximum number of layers or the maximum number of DMRS ports may be received through L1 signaling.

According to another embodiment, an operation method, performed by a terminal, for reducing power consumption of the terminal in a wireless communication system includes receiving configuration information about a number of layers or a number of DMRS ports for a PDSCH from a base station, determining whether the number of layers or the number of DMRS ports is less than a preset threshold, determining whether a time gap between a starting time of the PDSCH and a time at which the PDCCH is received is greater than a transition time $T_{gap}$ required to change an extent of antenna activation when the number of layers or the number of DMRS ports is less than the preset threshold, and activating only some of antennas based on the configuration information after $T_{gap}$ when the time gap between the starting time of the PDSCH and the time at which the PDCCH is received is greater than the transition time $T_{gap}$ required to change the extent of antenna activation.

In an embodiment, the operation method may further include activating all of the antennas to receive the PDSCH when the number of layers or the number of DMRS ports is greater than the preset threshold.

In an embodiment, the operation method may further include activating all of the antennas to receive the PDSCH when the time gap between the starting time of the PDSCH and the time at which the PDCCH is received is less than the transition time $T_{gap}$ required to change the extent of antenna activation.

Embodiments of the disclosure will now be described with reference to accompanying drawings.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments are provided so that this disclosure will be thorough and complete, and will fully convey the scope of the embodiments of the disclosure to those skilled in the art. Like numbers refer to like elements throughout the specification.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternate embodiments of the disclosure. For example, two successive blocks may be performed substantially at the same time or in reverse order.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a less number of components and modules, or further divided into a more number of components and modules. Moreover, the components and modules may be implemented to execute one or more central processing units (CPUs) in a device or security multimedia card. In embodiments, the module may include one or more processors.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 820.16e communication standards.

As a future communication system after LTE, a 5G or new radio (NR) communication system is required to freely reflect various requirements of users and service providers. Hence, in the 5G or NR system, services that satisfy various requirements simultaneously need to be supported. The services considered for the 5G or NR communication system may include enhanced Mobile Broadband (eMBB), massive Machine Type Communication (mMTC), Ultra Reliability Low Latency Communication (URLLC), etc.

The eMBB is aimed at providing more enhanced data rates than the existing LTE, LTE-A or LTE-Pro system may support. For example, in the 5G or NR communication system, the eMBB is required to provide 20 Gbps peak data rate in DL and 10 Gbps peak data rate in UL in light of a single base station. Furthermore, the 5G or NR communication system needs to provide increasing user perceived data rate while providing the peak data rate. To satisfy these requirements, enhancement of various technologies for transmission or reception including multiple-input multiple-output (MIMO) transmission technologies is required. While an LTE system uses up to 20 MHz transmission bandwidth in the 2 GHz band for signal transmission, the 5G or NR communication system may use frequency bandwidth wider than 20 MHz in the 3 to 6 GHz band or in the 6 GHz or higher band, thereby satisfying the data rate required by the 5G or NR communication system.

At the same time, in the 5G or NR communication system, mMTC is considered to support an application service such as Internet of Things (IoT). In order for the mMTC to provide the IoT efficiently, support for access from massive number of terminals in a cell, enhanced coverage of the terminal, extended battery time, reduction in terminal price, etc., are required. Because the IoT is equipped in various sensors and devices to provide communication functions, it may be supposed to support a large number of terminals in a cell (e.g., 1,000,000 terminals/km$^2$). Furthermore, a terminal supporting the mMTC is more likely to be located in a shadow area, such as underground of a building, which might not be covered by a cell by the nature of the service, so the mMTC requires an even larger coverage than expected for other services provided by the 5G or NR communication system. The terminal supporting the mMTC needs to be a low-cost terminal, and requires quite long battery life time such as 10 to 15 years because the battery in the terminal is hard to be changed frequently.

Finally, URLLC is a mission critical cellular-based wireless communication service. For example, the URLLC may provide services used for remote control over robots or machinery, industrial automation, unmanned aerial vehicle, remote health care, emergency alert, etc. Accordingly, communication offered by the URLLC requires very low latency and very high reliability. For example, URLCC services need to satisfy sub-millisecond (less than 0.5 millisecond) air interface latency and simultaneously require error rates lower than 1 packet loss in $10^{-5}$ packets. Hence, for the URLLC services, the 5G or NR system needs to provide a smaller transmit time interval (TTI) than for other services, and simultaneously requires a design that allocates a wide range of resources for a frequency band to secure reliability of the communication link.

Those three services in the 5G or NR communication system, eMBB, URLLC, and mMTC may be multiplexed in a single system for transmission. In this case, to meet different requirements for the respective services, different transmission or reception schemes and parameters may be used between the services.

Embodiments of the disclosure will be described in conjunction with accompanying drawings. Although the following embodiments of the disclosure will focus on the 5G or NR system as an example, they may be equally applied to other communication systems with similar technical backgrounds or channel types. For example, they may be applied to LTE or LTE-A mobile communication and future mobile communication technologies beyond 5G. Furthermore, embodiments of the disclosure will also be applied to other communication systems through some modifications to an extent that does not significantly deviate from the scope of the disclosure when judged by those of ordinary skill in the art.

When determined as making the subject matter of the disclosure unclear, the detailed description of related functions or structures in describing the disclosure may be skipped. Further, the terms as will be mentioned later, are defined by taking functionalities as will be described in the disclosure into account, but may vary depending on certain practices or intentions of users or operators. Accordingly, the terms should be defined based on the descriptions throughout this specification.

In the disclosure, operations of a base station and a terminal for reducing power consumption of the terminal in a wireless communication system will be described.

In the disclosure, to reduce power consumption of the terminal, terminals that are going to perform low-power communication may request a power saving mode directly from a base station. Upon receiving the request for the power saving mode, the base station may perform wake-up signal configuration, bandwidth part configuration having narrow bandwidth, long monitoring periodicity configuration for downlink control channel, single layer transmission configuration for the corresponding terminal, etc. Accordingly, the terminal is able to communicate with the base station in the power saving mode.

In the disclosure, some of antenna activation method for reducing power consumption of the terminal will be described. For example, the base station may configure the maximum number of transmission layers for the terminal. The terminal may expect that no layer beyond the maximum number of transmission layers would not be transmitted, and may operate a number of transmit or receive antenna ports equal to or less than the maximum number of transmission layers. In another example, when the terminal intends to perform communication in the power saving mode, the terminal may report back to the base station and update a capability for the number of layers that the terminal is able to support. In yet another example, the terminal may activate only some of antennas based on downlink control information received on a downlink control channel.

FIG. 1 illustrates a basic structure of the time-frequency domain, which is a radio resource region of a 5G or NR system.

Referring to FIG. 1, the horizontal axis represents the time domain, and the vertical axis represents the frequency domain. A basic resource unit in the time and frequency domain is a resource element (RE) 101, which may be defined as an Orthogonal Frequency Division Multiplexing (OFDM) symbol 102 on the time axis and a subcarrier 103 on the frequency axis. In the frequency domain, NscRB (e.g., 12) successive REs may constitute a single resource block (RB) 104.

Figure 2:
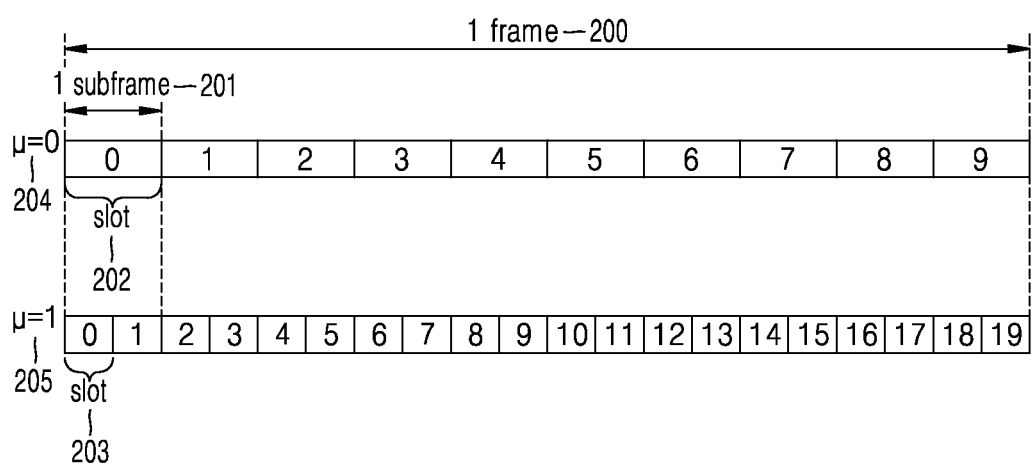
FIG. 2 illustrates a frame, subframe, and slot structures in a 5G or NR system.

FIG. 2 illustrates a frame, subframe, and slot structures in a 5G or NR system.

Referring to FIG. 2, structures of a frame 200, a subframe 201, and a slot 202 according to an embodiment of the disclosure are shown. The one frame 200 may be defined to have a length of 10 ms. The one subframe 201 may be defined to have a length of 1 ms, and thus a total of 10 subframes 201 may constitute the 1 frame 200. The one slot 202 or 203 may be defined to have 14 OFDM symbols (i.e., the number of symbols per 1 slot ($N_{symb}^{slot}$) is 14). The one subframe 201 may include one or more slots 202 and 203, and the number of slots 202 and 203 per 1 subframe may vary depending on subcarrier spacing configuration values p 204 and 205. FIG. 2 illustrates an occasion when μ=0 204 and μ=1 205 for the subcarrier spacing configuration values. In the case of μ=0 204, the one subframe 201 may include one slot 202, and in the case of μ=1 205, the one subframe 201 include two slots 203. That is, depending on the subcarrier spacing configuration value μ, the number of slots per 1 subframe ($N_{slot}^{subframe,\mu}$) may vary and the number of slots per 1 frame ($N_{slot}^{frame,\mu}$) may vary accordingly. $N_{slot}^{subframe,\mu}$ and $N_{slot}^{frame,\mu}$ depending on the subcarrier spacing setting value μ may be defined as in the following Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |

TABLE 1-continued

| $\mu$ | $N_{symb}^{slot}$ | $N_{slot}^{frame,\mu}$ | $N_{slot}^{subframe,\mu}$ |
|---|---|---|---|
| 4 | 14 | 160 | 16 |
| 5 | 14 | 320 | 32 |

The downlink control information (DCI) in the 5G or NR system will now be described in detail.

In the 5G or NR system, scheduling information for uplink data (or physical uplink shared channel (PUSCH)) or downlink data (or physical downlink shared channel (PDSCH)) is transmitted from the base station to the terminal in the DCI. The terminal may monitor a fallback DCI format and a non-fallback DCI format for PUSCH or PDSCH. The fallback DCI format may include a fixed field predefined between the base station and the terminal, and the non-fallback DCI format may include a configurable field.

The DCI may be transmitted on the physical downlink control channel (PDCCH) after going through channel coding and modulation processes. Cyclic redundancy check (CRC) may be appended to a DCI message payload, and the CRC may be scrambled by a radio network temporary identifier (RNTI) that corresponds to identity of the terminal (or UE). Depending on the use of the DCI message, e.g., UE-specific data transmission, power control command, random access response, or the like, different RNTIs are used. The RNTI is transmitted not explicitly but in a CRC calculation process. On reception of the DCI message transmitted on the PDCCH, the UE may check CRC with an allocated RNTI, and determine that the DCI message is transmitted to the UE when the CRC check result is correct.

For example, DCI that schedules a PDSCH for system information (SI) may be scrambled by an SI-RNTI. DCI that schedules a PDSCH for a random access response (RAR) message may be scrambled by an RA-RNTI. DCI that schedules a PDSCH for a paging message may be scrambled by a P-RNTI. DCI that notifies a slot format indicator (SFI) may be scrambled by an SFI-RNTI. DCI that notifies a transmit power control (TPC) may be scrambled by a TPC-RNTI. DCI that schedules UE-specific PDSCH or PUSCH may be scrambled by a Cell RNTI (C-RNTI).

DCI format 0_0 may be used for the fallback DCI that schedules the PUSCH, in which case the CRC may be scrambled by a C-RNTI. The DCI format 0_0 with the CRC scrambled by C-RNTI may include e.g., the following information.

TABLE 2

Identifier for DCI formats - [1] bit
Frequency domain resource assignment -
$\lceil \log_2(N_{RB}^{FL\_BWP}(N_{RB}^{UL\_BWP}+1)/2) \rceil$ ] bits
Time domain resource assignment - X bits
Frequency hopping flag - 1 bit
Modulation and coding scheme - 5 bits
New data indicator - 1 bit
Redundancy version - 2 bits
HARQ process number - 4 bits
TPC command for scheduled PUSCH - [2] bits
UL/SUL indicator - 0 or 1 bit DCI format 0_1 may be used for the non-fallback DCI that schedules the PUSCH, in which case the CRC may be scrambled by a C-RNTI. The DCI format 0_1 with the CRC scrambled by the C-RNTI may include e.g., the following information.

TABLE 3

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{UL\_BWP}/P \rceil$ bits
    For resource allocation type 1, $\lceil \log_2(N_{RB}^{UL\_BWP}(N_{RB}^{UL\_BWP}+1)/2) \rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook);
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits SRS resource indicator $- \left\lceil \log_2\left(\sum_{k=1}^{L_{max}} \binom{N_{SRS}}{k}\right) \right\rceil$ or $\lceil \log_2(N_{SRS}) \rceil$ bits $\left\lceil \log_2\left(\sum_{k=1}^{L_{max}} \binom{N_{SRS}}{k}\right) \right\rceil$ bits for non-codebook based PUSCH transmission;

$\lceil \log_2(N_{SRS}) \rceil$ bits for codebook based PUSCH transmission.
Precoding information and number of layers-up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used for the fallback DCI that schedules the PDSCH, in which case the CRC may be scrambled by a C-RNTI. The DCI format 1_0 with the CRC scrambled by the C-RNTI may include e.g., the following information.

TABLE 4

Identifier for DCI formats - [1] bit
Frequency domain resource assignment -
$\lceil \log_2(N_{RB}^{DL\_BWP}(N_{RB}^{DL\_BWP}+1)/2) \rceil$ ] bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUSCH - [2] bits
PUCCH resource indicator - 3 bits
PDSCH-to-HARQ feedback timing indicator - [3] bits DCI format 1_1 may be used for the non-fallback DCI that schedules the PDSCH, in which case the CRC may be scrambled by a C-RNTI. The DCI format 1_1 with the CRC scrambled by the C-RNTI may include e.g., the following information.

TABLE 5

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL,BWP}/P \rceil$ bits
For resource allocation type 1, $\lceil \log_2(N_{RB}^{DL,BWP}(N_{RB}^{DL,BWP} + 1)/2) \rceil$ bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit A method of configuring bandwidth parts considered by the 5G or NR communication system will now be described.

Figure 3:
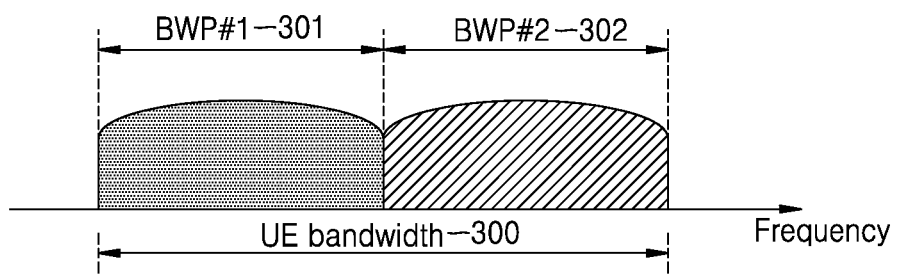
FIG. 3 is a diagram for describing configuration of bandwidth parts in a 5G or NR system.

FIG. 3 is a diagram for describing configuration of bandwidth parts in a 5G or NR system.

Referring to FIG. 3, UE bandwidth 300 is configured with two bandwidth part (BWPs), BWP #1 301 and BWP #2 302. A base station may configure the UE with one or more BWPs, and set the following information for each BWP.

TABLE 6

```
BWP ::=    SEQUENCE {
   bwp-Id              BWP-Id,
   locationAndBandwidth   INTEGER (1..65536),
   subcarrierSpacing      ENUMERATED {n0, n1, n2, n3, n4, n5},
   cyclicPrefix           ENUMERATED ( extended )
}.
```

Apart from these pieces of configuration information, various parameters related to the BWP may be configured for the UE. These pieces of configuration information may be transmitted by the base station to the UE through higher layer signaling, e.g., RRC signaling. At least one of the configured one or more BWPs may be activated. Whether to activate the configured BWP may be notified by the base station to the UE semi-statically through RRC signaling or dynamically through an MAC CE or DCI.

Configuration of the BWP supported by the 5G or NR system may be used for various purposes.

For example, when the bandwidth supported by the UE is less than the system bandwidth, the UE may be supported through BWP configuration. For example, in Table 6, a frequency location of the BWP (configuration information 2) is configured for the UE, thereby allowing the UE to transmit or receive data at a particular frequency location in the system bandwidth.

In another example, for the purpose of supporting different numerologies, the base station may configure multiple BWPs for the UE. For example, to support data transmission and reception using both a subcarrier spacing of 15 KHz and a subcarrier spacing of 30 KHz for a UE, two BWPs may be configured with subcarrier spacing of 15 KHz and 30 KHz, respectively. The different BWPs may be frequency division multiplexed, and for data transmission and reception with particular subcarrier spacing, a BWP configured with the subcarrier spacing may be activated.

In another example, for the purpose of reducing power consumption of the UE, the BS may configure BWPs with different sizes of bandwidth for the UE. For example, when the UE supports very large bandwidth, e.g., 100 MHz bandwidth, and always transmits or receives data in the bandwidth, the UE may consume very large power. In a situation where there is no traffic in particular, monitoring unnecessary downlink control channel in the large 100 MHz bandwidth is very inefficient in terms of power consumption. In this case, to reduce the power consumption of the UE, the base station may configure a BWP with relatively small bandwidth, e.g., a 20 MHz BWP, for the UE. In the situation that there is no traffic, the UE may perform monitoring in the 20 MHz BWP, and when data occurs, the UE may transmit or receive the data in an 100 MHz BWP under instructions from the base station.

In the method of configuring a BWP, UEs may receive configuration information for an initial BWP in a master information block (MIB) in an initial access process before being RRC connected. Specifically, the UE may be configured with a control resource set (CORESET) for a downlink control channel on which DCI may be transmitted to schedule a system information block (SIB) from the MIB of a physical broadcast channel (PBCH). Bandwidth of the control resource set configured in the MIB may be regarded as the initial BWP, and the UE may receive a PDSCH on which the SIB is transmitted in the initial BWP. The initial BWP may also be used for other system information (OSI), paging, or random access apart from reception of the SIB.

A downlink control channel in the 5G or NR communication system will now be described in detail with reference to related drawings.

Figure 4:
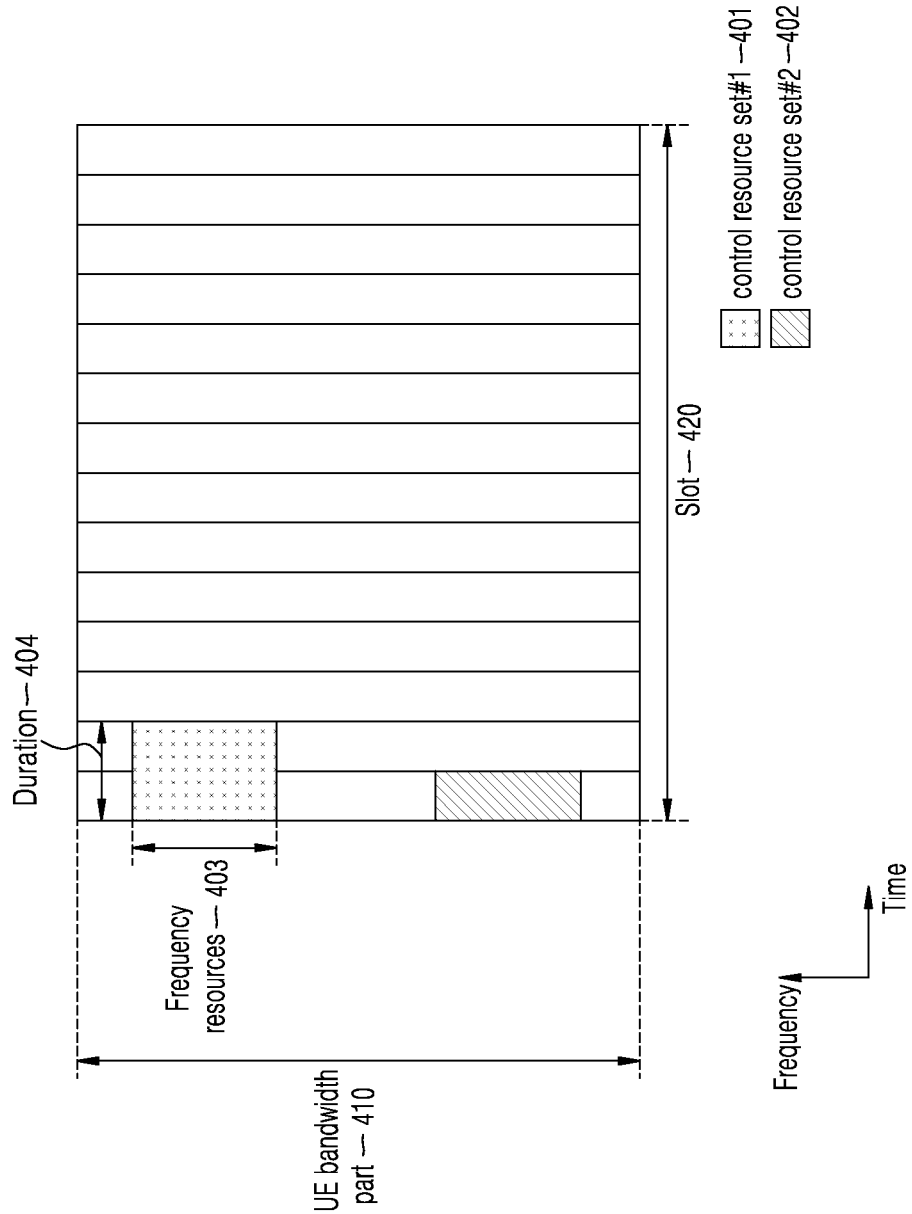
FIG. 4 is a diagram for describing configuration of control resource sets of a downlink control channel in a 5G or NR system.

FIG. 4 is a diagram for describing configuration of control resource sets of a downlink control channel in a 5G or NR system.

Referring to FIG. 4, an example of control resource sets (CORESETs) in which a downlink control channel is transmitted in the 5G or NR communication system is shown. In FIG. 4, a BWP 410 of a UE on the frequency axis and two control resource sets (CORESET #1 401 and CORESET #2 402) in a slot 420 on the time axis are configured. The control resource sets 401 and 402 may be configured in a particular frequency resource 403 in the entire UE BWP 410 on the frequency axis. One or more OFDM symbols may be configured on the time axis, and defined as control resource set duration 404. In FIG. 4, CORESET #1 401 is configured to have the control resource set duration of two symbols, and CORESET #2 402 is configured to have the control resource set duration of one symbol.

As described above, in a 5G or NR system, the control resource set may be configured by the base station for the UE through higher layer signaling, e.g., system information (SI), master information block (MIB), or radio resource control (RRC) signaling. Configuring the UE with the control resource set refers to providing the UE with information such as control resource set identity, a frequency location of the control resource set, length of symbols of the control resource set, etc. For example, the control resource set configuration information may include the following information:

TABLE 7

```
ControlResourceSet ::-                  SEQUENCE {
    -- Corresponds to L1 parameter 'CORESET-ID'
    controlResourceSetId                ControlResourceSetId,
    frequencyDomainResources            BIT STRING {SIZE {45}},
    duration                            INTEGER (1..maxCoReSetDuration),
    cce-REG-MappingType                 CHOICE {
        interleaved                     SEQUENCE {
            reg-BundleSize                  ENUMERATED {n2, n3, n6},
            precoderGranularity             ENUMERATED   (sameAsREG-
    bundle, allContiguousRBs),
            interleaverSize                 ENUMERATED {n2, n3, n6}
            shiftIndex
            INTEGER{0..maxNrofPhysicalResourceBlocks-1}
                }
        },
        nonInterleaved                  NULL
    },
    tci-StatesPDCCH                     SEQUENCE{size  {1..maxNrofTCI-
        StatesPDCCH}} OF TCI-StateId            OPTIONAL,
    tci-PresentInDCI                    ENUMERATED {enabled}
}.
```

Figure 5:
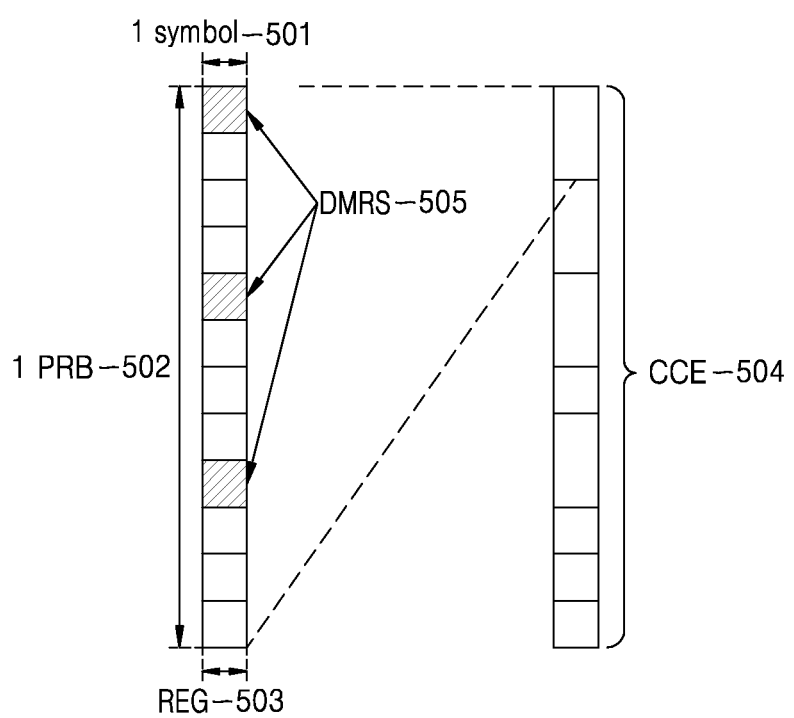
FIG. 5 illustrates a structure of a downlink control channel in a 5G or NR system.

FIG. 5 illustrates a structure of a downlink control channel in a 5G or NR system.

Referring to FIG. 5, a basic unit of time and frequency resource that forms a control channel is referred to as a resource element group (REG) 503, and the REG 503 may be defined by one OFDM symbol 501 on the time axis and one physical resource block (PRB) 502, i.e., 12 subcarriers on the frequency axis. Such REGs 503 may be successively arranged into a downlink control channel allocation unit.

As shown in FIG. 5, when a basic unit of allocating the downlink control channel is called a control channel element (CCE) 504 in a 5G or NR system, the one CCE 504 may be comprised of a plurality of REGs 503. For example, as shown in FIG. 5, the REG 503 may include 12 REs, and when one CCE 504 includes 6 REGs 503, the one CCE 504 may include 72 REs. When the downlink control resource set is configured, it may include multiple CCEs 504, and a particular downlink control channel may be transmitted by being mapped to one or more CCEs 504 based on an aggregation level (AL) in the control resource set. The CCEs 504 in the control resource set may be distinguished by numbers, in which case, the numbers may be given in a logical mapping method.

The basic unit of the downlink control channel as shown in FIG. 5, i.e., the REG 503, may include both REs to which DCI is mapped and a region to which a DMRS 505 that is a reference signal for decoding them is mapped. As shown in FIG. 5, three DMRSs 505 may be transmitted in one REG 503.

The number of CCEs required to transmit a PDCCH may be 1, 2, 4, 8, or 16 depending on the aggregation level (AL), and a different number of CCEs may be used to implement link adaptation of the downlink control channel. For example, when AL=L, a single downlink control channel may be transmitted in L CCEs. The UE needs to detect a signal without knowing of information about the downlink control channel, and search space representing a set of CCEs may be defined for the blind decoding. The search space may be a set of downlink control channel candidates including CCEs to be attempted by the UE for decoding at a given aggregation level. As there are various aggregation levels to have 1, 2, 4, 8, or 16 CCEs into a group, the UE has a plurality of search spaces. A search space set may be defined as a set of search spaces at all set aggregation levels.

The search spaces may be classified into common search spaces and UE-specific search spaces. A certain group of UEs or all the UEs may check into a common search space of the PDCCH to dynamically schedule the system information or receive common control information in the cell, such as a paging message. For example, PDSCH scheduling allocation information for transmitting an SIB that includes cell operator information or the like may be received by checking into the common search space of the PDCCH. For the common search space, a certain group of UEs or all the UEs need to receive the PDCCH, so the common search space may be defined as a set of pre-appointed CCEs. UE-specific PDSCH or PUSCH scheduling allocation information may be received by checking into the UE-specific search space of the PDCCH. The UE-specific search space may be UE-specifically defined as a function of various system parameters and identity of the UE.

In the 5G or NR system, parameters of the search space of the PDCCH may be configured by the base station for the UE in higher layer signaling (e.g., SIB, MIB, or RRC signaling). For example, the base station may configure the number of PDCCH candidates at each aggregation level L, monitoring periodicity for the search space, monitoring occasion in symbols in the slot for the search space, a type of the search space (common search space or UE-specific search space), a combination of a DCI format to be monitored in the search space and an RNTI, a control resource set index to monitor the search space, etc., for the UE. For example, the configuration information may include the following information:

TABLE 8

```
Searchspace ::-                         SEQUENCE {
    -- Identity of the search space. SearchSpaceId - 0 identifies the
        SearchSpace configured via PBCH (MIB) or ServingCellConfigCommon.
    searchSpaceId                       SearchSpaceId,
    controlResourceSetId                ControlResourceSetId,
    monitoringSlotPeriodicityAndOffset          CHOICE {
```

TABLE 8-continued

```
    s11                         NULL,
    s12                         INTEGER (0..1),
    s14                         INTEGER (0..3),
    s15                       INTEGER (0..4),
    s18                         INTEGER (0..7),
    s110                        INTEGER (0..9),
    s116                        INTEGER (0..15),
    s120                        INTEGER (0..19)
  }
  monitoringSymbolsWithinSlot        BIT STRING (SIZE {14}}
  nrofCandidates                     SEQUENCE {
    aggregationLevel1                ENUMERATED {n0, n1, n2, n3, n4,
n5, n6, n8},
    aggregationLevel2                ENUMERATED {n0, n1, n2, n3, n4,
n5, n6, n8},
    aggregationLevel4                ENUMERATED {n0, n1, n2, n3, n4,
n5, n6, n8},
    aggregationLevel8                ENUMERATED {n0, n1, n2, n3, n4,
n5, n6, n8},
    aggregationLevel16                  ENUMERATED {n0, n1, n2, n3,
n4, n5, n6, n8}
  },
  searchSpaceType                  CHOICE {
    -- Configures this search space as common search space (CSS) and
DCI formats to monitor.
    common                         SEQUENCE {
    }
    ue-Specific                    SEQUENCE {
      -- Indicates whether the UE monitors in this OSS for DCI
formats 0-0 and 1-0 or for formats 0-1 and 1-1,
      formats                      ENUMERATED {formats0-0-And-
1-0, formats0-1-And-1-1},
      ...
    }.
```

Based on the configuration information as described above, the base station may configure the UE with one or more search space sets. For example, the base station may configure the UE with search space set 1 and search space set 2, configure the UE to monitor DCI format A scrambled by an X-RNTI in the search space set 1 in the common search space and monitor DCI format B scrambled by a Y-RNTI in the search space set 2 in the UE-specific search space.

The configuration information may indicate that there is one or more search space sets in the common or UE-specific search space. For example, search space set #1 and search space set #2 may be configured as the common search space, and search space set #3 and search space set #4 may be configured as the UE-specific search space.

In the common search space, the following combinations of DCI formats and RNTIs may be monitored.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs as described above may follow the following definitions and uses.

C-RNTI (Cell RNTI): used for UE-specific PDSCH scheduling

TC-RNTI (Temporary Cell RNTI): used for UE-specific PDSCH scheduling

CS-RNTI (Configured Scheduling RNTI): used for semi-statically configured UE-specific PDSCH scheduling RA-RNTI (Random Access RNTI): used for PDSCH scheduling in a random access process P-RNTI (Paging RNTI): used for scheduling a PDSCH on which paging is transmitted SI-RNTI (System Information RNTI): used for scheduling a PDSCH on which system information is transmitted INT-RNTI (Interruption RNTI): used for indicating whether to puncture the PDSCH TPC-PUSCH-RNTI (Transmit Power Control for PUSCH RNTI): used for indicating power control command for a PUSCH TPC-PUCCH-RNTI (Transmit Power Control for PUCCH RNTI): used for indicating power control command for a PUCCH TPC-SRS-RNTI (Transmit Power Control for SRS RNTI): used for indicating power control command for an SRS The aforementioned DCI formats may conform to the following definitions.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |

TABLE 9-continued

| DCI format | Usage |
|---|---|
| 2_2 | Transmission of TPC commands for PUCCH and PUSCH |
| 2_3 | Transmission of a group of TPC commands for SRS transmissions by one or more UEs |

In a 5G or NR system, with a control resource set p and a search space set s, a search space at aggregation level L may be expressed as in the following equation.

$$L\left\{\left(Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI}\right) \bmod \lfloor N_{CCE,p}/L \rfloor\right\} + i \quad \text{[Equation 1]}$$

L: Aggregation Level
$n_{CI}$: Carrier Index
$N_{CCE,p}$: A total number of CCEs present in the control resource set p
$n_{s,f}^\mu$: Slot Index
$M_{p,s,max}^{(L)}$: A number of PDCCH candidates at aggregation level L
$m_{s,n_{CI}} = 0, \ldots, M_{p,s,max}^{(L)} - 1$: Indexes of PDCCH candidates at aggregation level L
i=0, ..., L−1

$$Y_{p,n_{s,f}^\mu} = \left(A_P \cdot Y_{p,n_{s,f-1}^\mu}\right) \bmod D$$

$$Y_{p,-1} = n_{RNTI} \neq 0$$

$$A_0 = 39827, A_1 = 39829, A_2 = 39839, D = 65537$$

$n_{RNTI}$: UE identifier

A value of $Y\_(p,n_{s,f}^\mu)$ may correspond to 0 for the common search space.

A value of $Y\_(p,n_{s,f}^\mu)$ may correspond to a value that changes according to UE identity (C-RNTI or ID configured by a base station for the UE) and time index for the UE-specific search space.

A physical uplink control channel (PUCCH) in the 5G communication system will now be described in detail with reference to accompanying drawings.

Figure 6:
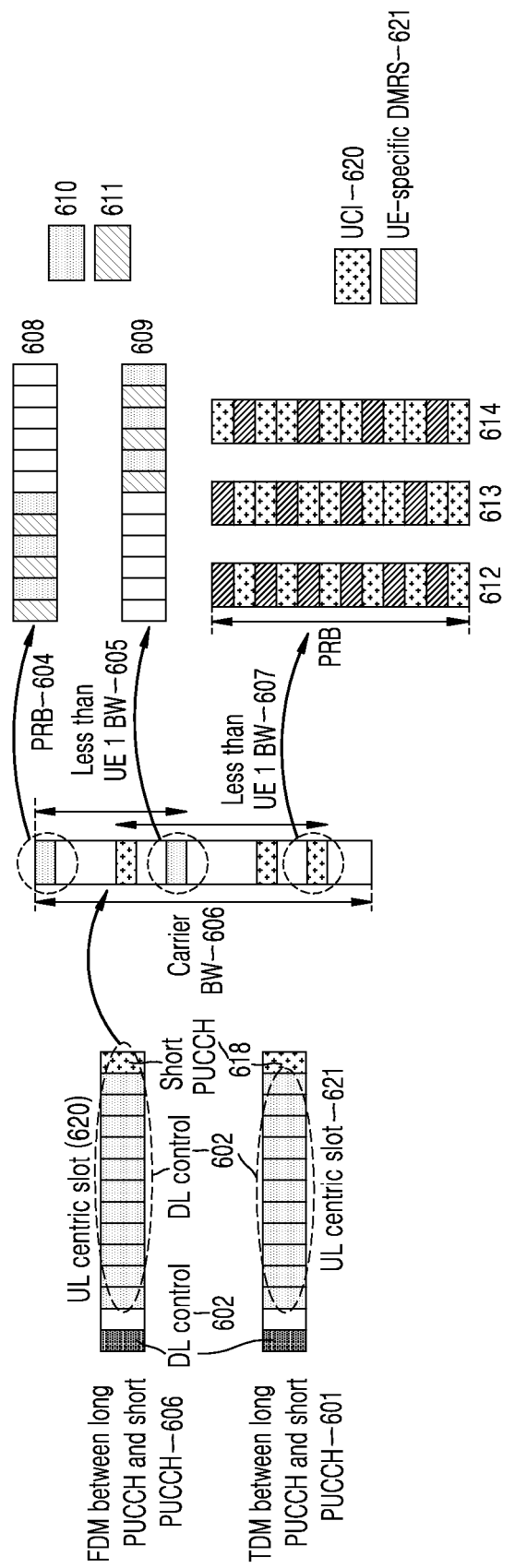
FIG. 6 illustrates a structure of an uplink control channel in a 5G or NR system.

FIG. 6 illustrates a structure of an uplink control channel in a 5G or NR system.

Referring to FIG. 6, how a long PUCCH and a short PUCCH are multiplexed in the frequency domain (FDM) 600 or in the time domain (TDM) 601 are shown. Firstly, a slot structure in which a long PUCCH 603 and a short PUCCH 618 are multiplexed in FIG. 6 will be described. 620 and 621 show slots (various terms such as subframes or transmission time intervals (TTIs) may be used. In the disclosure, the basic transmission unit is termed a slot) which are basic transmission units in the 5G or NR system, in which uplink is mainly used, i.e., UL centric slots. The UL centric slots are an occasion when the most number of OFDM symbols are used for uplink, or all the OFDM symbols may be used for uplink transmission or some OFDM symbols may be used for downlink, and in a case that both downlink and uplink are present in one slot, there may be a gap between the two. In FIG. 6, in a slot, the first OFDM symbol is used for downlink transmission, e.g., downlink control channel transmission 602 and OFDM symbols from the third OFDM symbol are used for uplink transmission. The second OFDM symbol is used as a transmission gap. In the uplink transmission, uplink data channel transmission and uplink control channel transmission are possible.

Next, the long PUCCH 603 will be described.

As a control channel having a long transmission period is used for enlarging cell coverage, it may be transmitted in a discrete Fourier transform (DFT) spread (S) OFDM (DFT-S-OFDM) method, which is a single carrier transmission rather than an OFDM transmission. Hence, the transmission is to be performed only using successive subcarriers, and for gaining frequency diversity effects, an uplink control channel having a long transmission period is configured at separated positions such as in 608 and 609. A separation distance in frequency 605 needs to be less than the bandwidth supported by the UE, in which case transmission in a front portion of the slot is performed using PRB-1 as in 608 while transmission in a rear portion of the slot is performed using PRB-2 as in 609. Here, a PRB is a physical resource block referring to a minimum transmission unit in frequency, and may be defined with e.g., 12 subcarriers. Accordingly, frequency ranges of the PRB-1 and PRB-2 need to be less than a maximum bandwidth supported by the UE, and the maximum bandwidth supported by the UE may be equal to or less than bandwidth 606 supported by the system. The frequency resources PRB-1 and PRB-2 may be configured for the UE by a higher signal, in which case, the frequency resources are mapped by the higher signal to bit fields, and which frequency resources may be used may be indicated by the bit fields included in a downlink control channel to the UE. Furthermore, a control channel transmitted in the front portion of the slot in 608 and a control channel transmitted in the rear portion of the slot in 609 are each configured with uplink control information (UCI) 610 and a UE reference signal 611, and the two signals are assumed to be separated in time and transmitted in different OFDM symbols.

The long PUCCH 603 supports transmission formats such as PUCCH format 1, PUCCH format 3, and PUCCH format 4 depending on the number of control information bits that may be supported and whether to support UE multiplexing through Pre-DFT OCC support at a front stage of inverse fast Fourier transform (IFFT). First, the PUCCH format 1 is a DFT-S-OFDM based long PUCCH format that may support up to 2-bit control information. The control information may be configured with a combination or each of HARQ-ACK and a scheduling request (SR). The PUCCH format 1 is configured repeatedly with OFDM symbols including a demodulation reference signal DMRS and OFDM symbols including uplink control information (UCI). For example, when the PUCCH format 1 has 8 transmission symbols, it is configured with a DMRS symbol, a UCI symbol, a DMRS symbol, a UCI symbol, a DMRS symbol, a UCI symbol, a DMRS symbol, and a UCI symbol in sequence from the first starting symbol. The DMRS symbol has a structure of spreading a sequence as long as 1 RB on the frequency axis using an orthogonal code (or an orthogonal sequence or a spreading code w_i(m)) on the time axis, and performing IFFT and transmission. The UCI symbol has a structure of generating d(0) by BPSK modulation for 1-bit control information and QPSK modulation for 2-bit control information, scrambling the d(0) by multiplying the d(0) by a sequence as long as 1 RB on the frequency axis, spreading the scrambled sequence using an orthogonal code (or an orthogonal sequence or a spreading code w_i(m)) on the time axis, and performing IFFT and transmission. The UE generates a sequence based on group hoping configured by a higher signal from a base station or sequence hoping configuration and configured ID, and generates a sequence as long as 1 RB by cyclic-shifting a sequence generated with an initial cyclic shift (CS) value indicated.

$w\_i(m)$ is given as follows according to length $N_{SF}$ of a spreading code. i refers to an index of the spreading code itself, and m refers to indexes of elements of the spreading code. Here, numbers in [ ] in Table 10 refer to $\varphi(m)$, and for example, when the spreading code has a length of 2, the spreading code $w\_i(m)$ becomes $w_i(0)=e^{j2\pi \cdot 0/N_{SF}}=1$ $(1)=e^{j2\pi \cdot 0/N_{SF}}=1$, so $w\_i(m)=[1\ 1]$.

bols available for transmission in a UE is reduced based on the number of UEs to be multiplexed.

Next, the short PUCCH 618 will be described. The short PUCCH may be transmitted in both the downlink centric slot and the uplink centric slot, and generally transmitted in the last symbol of the slot or an OFDM symbol in a rear portion of the slot (e.g., the last OFDM symbol or the second last OFDM symbol or the last two OFDM symbols). Of course, it is also possible to transmit the short PUCCH at an

TABLE 10

Spreading code for PUCCH format 1 $w_i(m) = e^{j2\pi\varphi(m)/N_{SF}}$

| $N_{SF}$ | i = 0 | i = 1 | i = 2 | i = 3 | i = 4 | i = 5 | i = 6 |
|---|---|---|---|---|---|---|---|
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Next, the PUCCH format 3 is a DFT-S-OFDM based long PUCCH format that may support control information in more than 2 bits. The control information may be configured with a combination or each of HARQ-ACK, channel state information (CSI), and an SR. In the PUCCH format 3, the DMRS symbol position is presented in the following Table 11 depending on whether frequency hopping exists and whether an additional DMRS symbol is configured.

arbitrary position in the slot. And the short PUCCH may be transmitted using an OFDM symbol, two OFDM symbols, or a plurality of OFDM symbols. In FIG. 6, the short PUCCH 618 is transmitted in the last symbol of the slot. Radio resources for the short PUCCH are allocated in PRBs on the frequency axis, in which case one or a plurality of successive PRBs may be allocated or a plurality of PRBs separated in the frequency domain may be allocated. The

TABLE 11

| | DMRS position in PUCCH format 3/4 transmission | | | |
|---|---|---|---|---|
| | No additional DMRS configured | | Additional DMRS configured | |
| PUCCH format 3/4 transmission length | No frequency hopping configured | Frequency hopping configured | No frequency hooping configured | Frequency hopping configured |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

For example, when the PUCCH format 3 has 8 transmission symbols, the DMRS is transmitted in the first and fifth symbols of the 8 symbols starting with a first starting symbol 0. Table 11 may be equally applied to DMRS symbol positions of the PUCCH format 4.

Next, the PUCCH format 4 is a DFT-S-OFDM based long PUCCH format that may support control information in more than 2 bits. The control information may be configured with a combination or each of HARQ-ACK, channel state information (CSI), and an SR. A difference between the PUCCH format 4 and the PUCCH format 3 is that the PUCCH format 4 may multiplex the PUCCH format 4 of various UEs in one RB. It is possible to multiplex the PUCCH format 4 of a plurality of UEs through application of Pre-DFT OCC to the control information at a front stage of IFFT. However, the number of control information symallocated PRBs need to be included in a band equal to or less than a frequency band 607 supported by the UE. The plurality of PRBs, which are the allocated frequency resources, may be configured for the UE by a higher signal, in which case, the frequency resources are mapped by the higher signal to bit fields, and which frequency resources may be used may be indicated by the bit fields included in a downlink control channel to the UE. Furthermore, the uplink control information 620 and the demodulation reference signal 621 in a PRB need to be multiplexed in a frequency band, and there may be a method of transmitting the demodulation reference signal on one subcarrier per every two symbols as in 612, a method of transmitting the demodulation reference signal on one subcarrier per every three symbols as in 613, or a method of transmitting the demodulation reference signal on one subcarrier per every four symbols as in 614. Which one of the methods of transmitting the demodulation reference signal as in 612, 613, and 614 may be configured by a higher signal. Or one of mapping methods is defined in a standard, and the UE transmits the short PUCCH according to the mapping method and the base station demodulates the short PUCCH according to the mapping method. Or the UE multiplexes and transmits the demodulation reference signal and the uplink control information as in the method indicated through reception of a higher signal. Or a method of transmitting the demodulation reference signal may be determined according to the number of bits of the uplink control information 620. For example, when the number of bits of the uplink control information is small, the UE may perform transmission through multiplexing of the demodulation reference signal and the uplink control information as in 612. When the number of bits of the uplink control information is small, a sufficient transmission code rate may be attained even though not many resources are used for transmission of the uplink control information. For example, when the number of bits of the uplink control information is large, the UE may perform transmission through multiplexing of the demodulation reference signal and the uplink control information as in 614. When the number of bits of the uplink control information is large, many resources for transmission of the uplink control information need to be used to reduce the transmission code rate The short PUCCH 618 supports transmission formats such as the PUCCH format 0 and the PUCCH format 2 depending on the number of bits of the control information that may be supported. First, the PUCCH format 0 is a cyclic prefix (CP) OFDM (CP-OFDM) based short PUCCH format that may support up to 2-bit control information. The control information may be configured with a combination or each of HARQ-ACK and an SR. The PUCCH format 0 has a structure of transmitting not a DMRS but only a sequence mapped to 12 subcarriers on the frequency axis in one OFDM symbol. The UE generates a sequence based on group hoping configured by a higher signal from a base station or sequence hoping configuration and configured ID, and cyclically shifts a sequence generated with a final cyclic shift (CS) value resulting from addition of a different CS value depending on whether it is ACK or NACK to an indicated initial CS value, maps the sequence to 12 subcarriers, and transmits the mapped sequence. For example, when HARQ-ACK is in 1 bit, the final CS value is generated by adding 6 to an initial CS value for ACK and 0 to the initial CS value for NACK as in the following Table 12. The CS value 0 for NACK and the CS value 6 for ACK are defined in a standard, and the UE may always generate the PUCCH format 0 based on the corresponding value to transmit 1-bit HARQ-ACK.

TABLE 12

| 1-bit HARQ-ACK | NACK | ACK |
|---|---|---|
| Final CS | {Initial CS + 0} mod 12 = Initial CS | Initial CS mod 12 |

For example, in a case that HARQ-ACK is in 2 bits, as in the following Table 13, for (NACK, NACK), 0 is added to the initial CS value, for (NACK, ACK), 3 is added to the initial CS value, for (ACK, ACK), 6 is added to the initial CS value, and for (ACK, NACK), 9 is added to the initial CS value. The CS values 0, 3, 6, and 9 for (NACK, NACK), (NACK, ACK), (ACK, ACK), and (ACK, NACK), respectively, are defined in a standard, and the UE always generates the PUCCH format 0 based on the corresponding value and transmits 2-bit HARQ-ACK.

When the final CS value resulting from adding a CS value based on whether it is ACK or NACK to the initial CS value, it is obvious that modulo 12 is applied because a length of the sequence is 12.

TABLE 13

| 2-bit HARQ-ACK | NACK, NACK | NACK, ACK | ACK, ACK | ACK, NACK |
|---|---|---|---|---|
| Final CS | {Initial CS + 0} mod 12 = Initial CS | (Initial CS + 3) mod 12 | (Initial CS + 6) mod 12 | (Initial CS + 9) mod 12 |

Next, the PUCCH format 2 is a CP-OFDM based short PUCCH format that may support control information in more than 2 bits. The control information may be configured with a combination or each of HARQ-ACK, CSI, and an SR. In the PUCCH format 2, subcarrier positions at which the DMRS is transmitted in one OFDM symbol are fixed to subcarriers having indexes #1, #4 , #7, and #10 given that the first subcarrier index is #0 as in 614 of FIG. 6. The control information is mapped to all subcarriers but the subcarriers where the DMRS is positioned, through a modulation process after channel coding.

In the disclosure, hereinafter, a short PUCCH refers to the PUCCH format 0 or the PUCCH format 2 unless otherwise specified, and a long PUCCH refers to the PUCCH format 1, the PUCCH format 3, or the PUCCH format 4 unless otherwise specified. Furthermore, in the disclosure, transmitting in a PUCCH format X means transmission is performed using a PUCCH resource for the PUCCH format X obtained in the method of the disclosure e.g., by being indicated or induced by the base station, unless otherwise specified.

Figure 7:
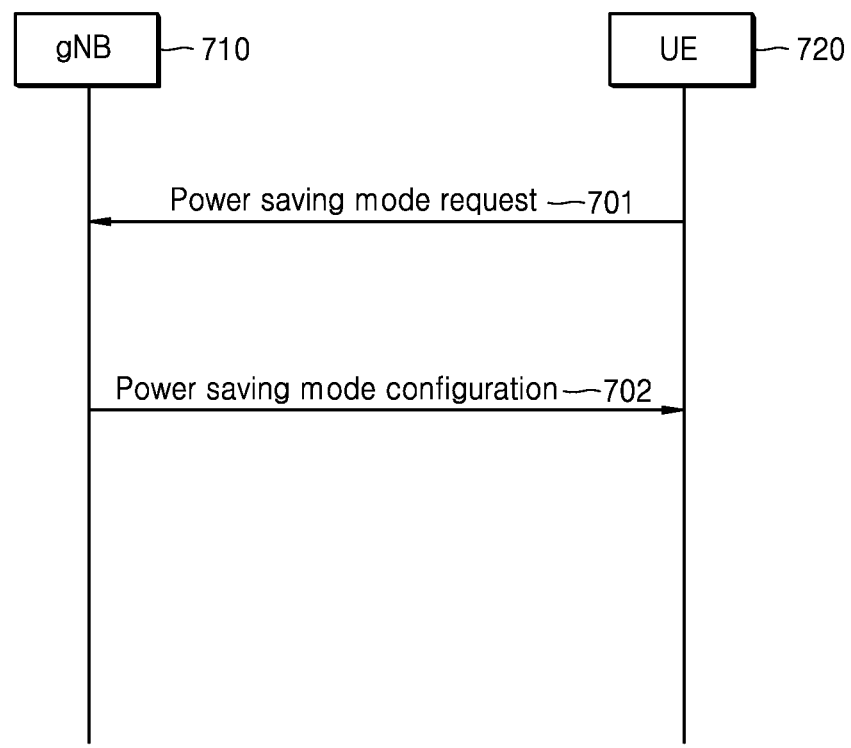
FIG. 7 illustrates how to reduce power consumption of a terminal in a wireless communication system, according to an embodiment.

FIG. 7 illustrates how to reduce power consumption of a terminal in a wireless communication system, according to an embodiment of the disclosure.

Referring to FIG. 7, operation for a UE to operate in a power saving mode and a method of configuring a power saving mode by a base station will be described. Specifically, FIG. 7 illustrates an operation procedure between a base station (gNB) 710 and a user equipment (UE) 720 based on power saving mode operations of the UE.

In operation 701, the UE 720 may transmit a message requesting a power saving mode (in the disclosure, it is called a power saving mode request (PSR)) to the gNB 710. In an embodiment, the UE 720 may notify the gNB 710 of the PSR message through higher layer signaling (e.g., medium access control (MAC) control element (CE) or remote radio control (RRC) signaling) or L1 signaling (e.g., a PUCCH, a PUSCH, or a physical layer channel on which a PSR may be transmitted).

In operation 702, upon receiving the message requesting the power saving mode, i.e., the PSR message from the UE 720, the gNB 710 may transmit configuration information or an indicator related to the power saving mode to the UE 720. In an embodiment, the configuration information relating to the power saving mode may be notified to the UE 720 from the gNB 710 through higher layer signaling (e.g., MAC CE or RRC signaling), and the indicator related to the power saving mode may be notified to the UE 720 from the gNB 710 through L1 signaling (e.g., DCI).

Explaining the operation 701 in more detail, the PSR message may include one or more of the following pieces of information.

[PSR Message Information]
- power saving mode request indicator (power saving mode)
- maximum bandwidth X1 for a bandwidth part to be configured in the power saving mode
- minimum value X2 of a PDCCH monitoring periodicity to be configured in the power saving mode
- maximum value X3 of the number of PDCCH candidates to be configured in the power saving mode
- maximum value X4 of the number of layers to be configured in the power saving mode In an embodiment, the UE may transmit the PSR message to the gNB by using a PUCCH. In this case, the gNB may pre-configure a PUCCH resource on which to transmit the PSR message to the UE. The UE may transmit the PSR message on the PUCCH resource configured for the PSR message. Furthermore, the PSR message may be multiplexed with a PUCCH on which other UCI (e.g., a scheduling request (SR), HARQ-ACK, channel quality information (CQI), etc.) is transmitted and then transmitted.

In an embodiment, the UE may transmit the PSR message to the gNB by using a PUSCH. When the PSR message is multiplexed and transmitted on the PUSCH, a resource region in the PUSCH on which the PSR message is transmitted may be predefined or determined by a length of the other UCI message (e.g., SR, HARQ-ACK, CQI, etc.).

In an embodiment, the UE may transmit the PSR message to the gNB by using a physical layer channel dedicated to the PSR message (referred to as a PSRCH). In this case, the gNB may notify the UE of configuration information for the PSRCH through higher layer signaling, e.g., RRC signaling. The configuration information for the PSRCH may include one or more of the following pieces of information.

[PSRCH Configuration Information]
- time resource region
- frequency resource region
- periodicity and offset information In an embodiment, the UE may transmit the PSR message to the gNB by higher layer signaling, e.g., MAC CE or RRC signaling.

Explaining the operation 702 in more detail, upon reception of the PSR message, the gNB may configure all or part of the following contents for the UE through higher layer signaling (e.g., MAC CE or RRC signaling).

[Power Saving Mode Related Configuration Information]

In an embodiment, the gNB may further configure a bandwidth part having narrow bandwidth (e.g., bandwidth equal to or less than X1 RBs) for the UE. The UE is configured to operate in a very narrow bandwidth part having X1 or less bandwidth, thereby significantly reducing power consumed at a radio frequency (RF) stage of the UE. In an embodiment, the value X1 may be predefined. Alternatively, the value X1 may correspond to a size equal to an initial bandwidth part or the value X1 may be reported by the UE to the gNB in a UE capability. Or the value X1 may be notified by the UE to the gNB by higher layer signaling, e.g., in an MAC CE or RRC message. Or the value X1 may be notified by the UE to the gNB through L1 signaling, e.g., a PUCCH, a PUSCH, or a physical layer channel on which a PSR may be transmitted.

In an embodiment, the gNB may configure a configuration value of a monitoring periodicity to be a value equal to or greater than X2 among search space related configuration information (Table 8) for the PDCCH for the UE. In monitoring a PDCCH by the UE, with enlargement of the monitoring periodicity, an amount of power consumption due to PDCCH blind decoding of the UE may be reduced. In an embodiment, the value X2 may be predefined. Or the value X2 may be reported by the UE to the gNB in a UE capability. Or the value X2 may be notified by the UE to the gNB by higher layer signaling, e.g., in an MAC CE or RRC message. Or the value X2 may be notified by the UE to the gNB through L1 signaling, e.g., a PUCCH, a PUSCH, or a physical layer channel on which a PSR may be transmitted.

In an embodiment, the gNB may configure a value of the number of PDCCH candidates so that a total sum of the number of PDCCH candidates to be monitored for overall slots to have a value equal to or less than X3 among the search space related configuration information (Table 8) for the PDCCH for the UE. In monitoring the PDCCH by the UE, with reduction in the number of blind decoding times, an amount of power consumption due to PDCCH blind decoding of the UE may be reduced. In an embodiment, the value X3 may be predefined. Or the value X3 may be reported by the UE to the gNB in a capability. Or the value X3 may be notified by the UE to the gNB by higher layer signaling, e.g., in an MAC CE or RRC message. Or the value X3 may be notified by the UE to the gNB through L1 signaling, e.g., a PUCCH, a PUSCH, or a physical layer channel on which a PSR may be transmitted. Or the value X3 may be given as a function of a maximum value Z of the number of PDCCH candidates to be monitored for each slot. For example, it may be given that $X3=\alpha \cdot Z$, $0 \leq \alpha \leq 1$. In 5G, the value Z may vary depending on subcarrier spacing, and may be defined as in e.g., the following Table 14.

TABLE 14

| $\mu$ | Maximum number of PDCCH candidates per slot and per serving cell (Z) |
| --- | --- |
| 0 | 44 |
| 1 | 36 |
| 2 | 22 |
| 3 | 20 |

In Table 14, the subcarrier spacing may be defined to be $15 \cdot 2^{\mu}$ kHz.

In an embodiment, the gNB may always configure the UE to perform transmission or reception only with X4 or less layers (or equally configure the UE to use always X4 or less DMRS ports) in transmitting or receiving a data channel, i.e., a PDSCH or a PUSCH. As the UE may only assume a small number of layers for data transmission or reception, the UE may keep the number of active antennas small, thereby significantly reducing power consumption from this. In an embodiment, the value X4 may be predefined (e.g., X4 may correspond to 1 or 2). Or the value X4 may be reported by the UE to the gNB in a UE capability. Or the value X4 may be notified by the UE to the gNB by higher layer signaling, e.g., in an MAC CE or RRC message. Or the value X4 may be notified by the UE to the gNB through L1 signaling, e.g., a PUCCH, a PUSCH, or a physical layer channel on which a PSR may be transmitted.

upon reception of the PSR message, the gNB may indicate all or part of the following contents to the UE through L1 signaling (e.g., DCI).

[Power Saving Mode Related Indicator Information]

In an embodiment, the gNB may indicate a change in bandwidth part to a bandwidth part corresponding to narrow bandwidth in DCI to the UE. For example, when a bandwidth part #1 corresponding to 100 MHz and a bandwidth part #2 corresponding to 10 MHz are configured for the UE and a currently active bandwidth part corresponds to the bandwidth part #1, the BS may transmit DCI indicating a change to the bandwidth part #2 to the UE. The UE may operate in a bandwidth part corresponding to narrow bandwidth and thus, significantly reduce power consumption at an RF stage of the UE.

In an embodiment, the gNB may schedule a data channel, a PDSCH or a PUSCH always with Y1 or less layers. The UE that has transmitted the PSR may expect that the data channel is scheduled with Y1 or less layers. As the UE expects that the data channel is transmitted with a small number of layers, the UE may activate a fewer number of antennas to be operated, thereby reducing power consumption. In an embodiment, the value Y1 may be predefined (e.g., Y1 may correspond to 1 or 2). Or the value Y1 may be reported by the UE to the gNB in a UE capability. Or the value Y1 may be notified by the UE to the gNB by higher layer signaling, e.g., in an MAC CE or RRC message. Or the value Y1 may be notified by the UE to the gNB through L1 signaling, e.g., a PUCCH, a PUSCH, or a physical layer channel on which a PSR may be transmitted.

In an embodiment, the UE that has transmitted the PSR message and operated in the power saving mode may release the power saving mode through additional signaling. Specifically, the UE may transmit a message corresponding to power saving mode release (referred to as a power saving mode release request (PSR2)) to the gNB. In an embodiment, the UE may notify the PSR2 message to the gNB through higher layer signaling (e.g., MAC CE or RRC signaling) or L1 signaling (e.g., a PUCCH, a PUSCH, or a physical layer channel on which a PSR may be transmitted or a physical layer channel on the PSR2 may be transmitted).

The gNB having received the power saving mode release request message, i.e., the PSR2 message, from the UE does not need to necessarily notify configuration information or an indicator related to the power saving mode defined for the UE, and may freely operate parameters related to data transmission or reception.

Figure 8:
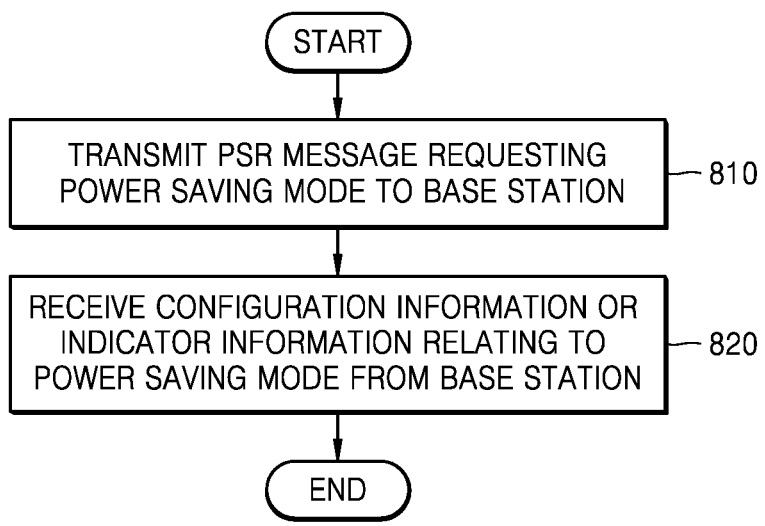
FIG. 8 is a flowchart illustrating an operation method, performed by a terminal, for reducing power consumption of the terminal in a wireless communication system, according to an embodiment.

FIG. 8 is a flowchart illustrating an operation method, performed by a terminal, for reducing power consumption of the terminal in a wireless communication system, according to an embodiment.

Referring to FIG. 8, in operation 810, a terminal transmits a power saving mode request (PSR) message requesting a power saving mode to a base station. The terminal may need to operate in the power saving mode for various reasons. For example, the terminal may request the power saving mode from the base station for such reasons as having little battery left, having requirement for reducing power consumption as much as possible at a user's request, etc. In an embodiment, the terminal may transmit the PSR message to the base station according to a preset reference or an input from the user.

Subsequently, in operation 820, the terminal receives configuration information or indicator information relating to the power saving mode from the base station. The terminal may operate in the power saving mode by operating to reflect the configuration information or the indicator information. In an embodiment, the configuration information or the indicator information relating to the power saving mode may include configuration information or indicator information based on information included in the PSR message in operation 810.

Figure 9:
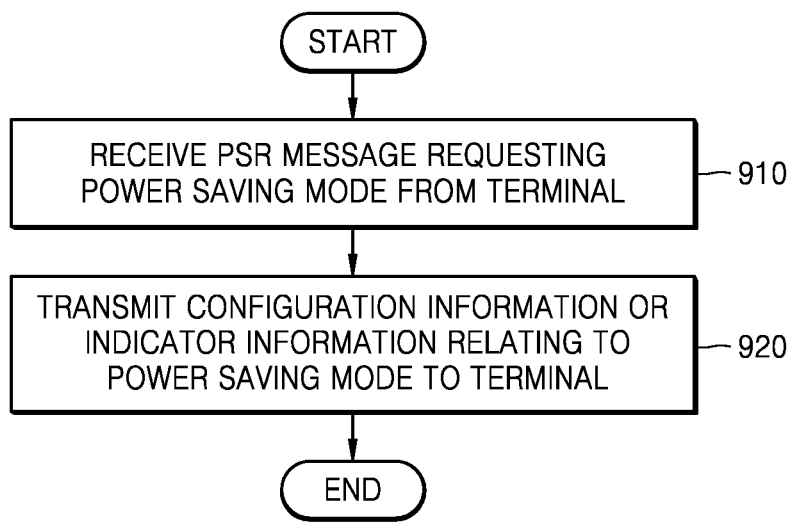
FIG. 9 is a flowchart illustrating an operation method, performed by a base station, for reducing power consumption of a terminal in a wireless communication system, according to an embodiment.

FIG. 9 is a flowchart illustrating an operation method, performed by a base station, for reducing power consumption of a terminal in a wireless communication system, according to an embodiment.

Referring to FIG. 9, in operation 910, a base station receives a PSR message requesting the power saving mode from a terminal. As described above, the PSR message may include various information according to settings of the terminal.

Subsequently, in operation 920, the base station transmits configuration information or indicator information relating to the power saving mode to the terminal in response to the PSR message. In an embodiment, based on information included in the PSR message received in operation 910, the configuration information or the indicator information may be transmitted to the terminal.

Figure 10:
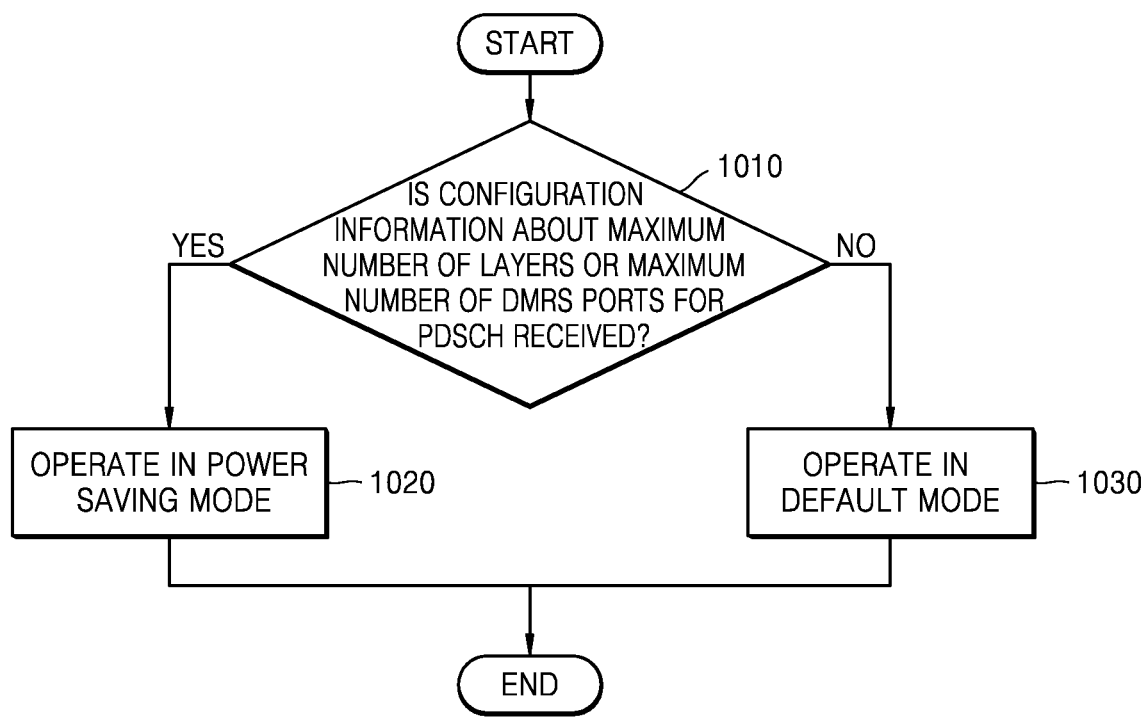
FIG. 10 is a flowchart illustrating a method of reducing power consumption of a terminal in a wireless communication system, according to another embodiment.

FIG. 10 is a flowchart illustrating a method of reducing power consumption of a terminal in a wireless communication system, according to another embodiment.

In a 5G or NR system, it is recommended for the terminal to operate 4 receive antenna ports as default. When the terminal operates at least 4 receive antenna ports, an amount of power consumption of the terminal may significantly increase. In the disclosure, a method by which power consumption of the terminal may be reduced by allowing the terminal to operate with less than 4 antenna ports according to a configuration of the base station in a situation where the terminal operates with at least 4 receive antenna ports is described.

In an embodiment, the base station may configure the maximum number X of layers for a PDSCH for the terminal. For example, X may have a value of 1 or 2. In scheduling a PDSCH for the terminal, the base station may always schedule and transmit only a PDSCH corresponding to X or less layers, and notify the terminal of the corresponding scheduling information in DCI. When receiving a configuration of the maximum number X of layers from the base station, the terminal may not expect transmission of the PDSCH with X or more layers. Accordingly, the terminal may operate as many antenna ports as it may receive X layers.

In an embodiment, the base station may configure the maximum number Y of DMRS ports for a PDSCH for the terminal. For example, Y may have a value of 1 or 2. In scheduling a PDSCH for the terminal, the base station may always use DMRSs corresponding to X or less DMRS ports for transmission, and notify the terminal of the corresponding DMRS information in DCI. When receiving a configuration of the maximum number Y of DMRS ports for receiving a PDSCH from the base station, the terminal may not expect transmission of the PDSCH with Y or more DMRS ports. Accordingly, the terminal may operate as many antenna ports as it may operate Y DMRS ports.

Referring to FIG. 10, the terminal may determine whether the terminal has received configuration information about the maximum number of layers or maximum number of DMRS ports for the PDSCH from the base station, in operation 1010. When the terminal has received the configuration information from the base station in operation 1010, the terminal may proceed to operation 1020 to operate in the power saving mode. Here, the power saving mode may correspond to an operation to activate antennas as little as possible, which are required to support e.g., the maximum number of layers or DMRS ports configured from the base station. When the terminal has not received the configuration information from the base station in operation 1010, the terminal may proceed to operation 1030 to operate in a default mode. Here, the default mode may correspond to an operation to activate antennas required to support e.g., the number of layers or DMRS ports corresponding to a UE capability.

FIG. 11 illustrates how to reduce power consumption of a terminal in a wireless communication system, according to another embodiment.

In a 5G or NR system, it is recommended for the terminal to operate 4 receive antenna ports as default. When the terminal operates with at least 4 receive antenna ports, an amount of power consumption of the terminal may significantly increase as physical antennas corresponding to the corresponding antenna ports need to be all activated. In the disclosure, a method by which a terminal partially activates and operates antenna ports or physical antennas corresponding to the antenna ports to receive a PDSCH based on scheduling information for the PDSCH indicated in DCI is described.

Referring to FIG. 11, a terminal (UE) 1100 may activate (1103) all of the antennas (or equally, physical antennas for reception through at least 4 receive antenna ports) for reception for a period of time T1 (1105) to receive and monitor a PDCCH 1101. In an embodiment, the UE 1100 may receive DCI including scheduling information for a PDSCH 1102 from the PDCCH 1101. When there is no problem with decoding even after the scheduled PDSCH 1102 is received without activation of all of the antennas, the UE 1100 may receive the PDSCH 1102 by only activating some of antennas (or equally, physical antennas for reception with less than 4 antenna ports) for a period of time T2 (1106) to receive and decode the PDSCH. In this case, there may be a transition time 1107 required to deactivate some of the entire antennas and activate only the other antennas. In the disclosure, the transition time 1107 required to change the extent of antenna activation is defined as $T_{gap}$. The UE 1100 may have a power saving effect from the antenna deactivation by activating some of antennas (1104) while receiving the PDSCH 1102.

Figure 12:
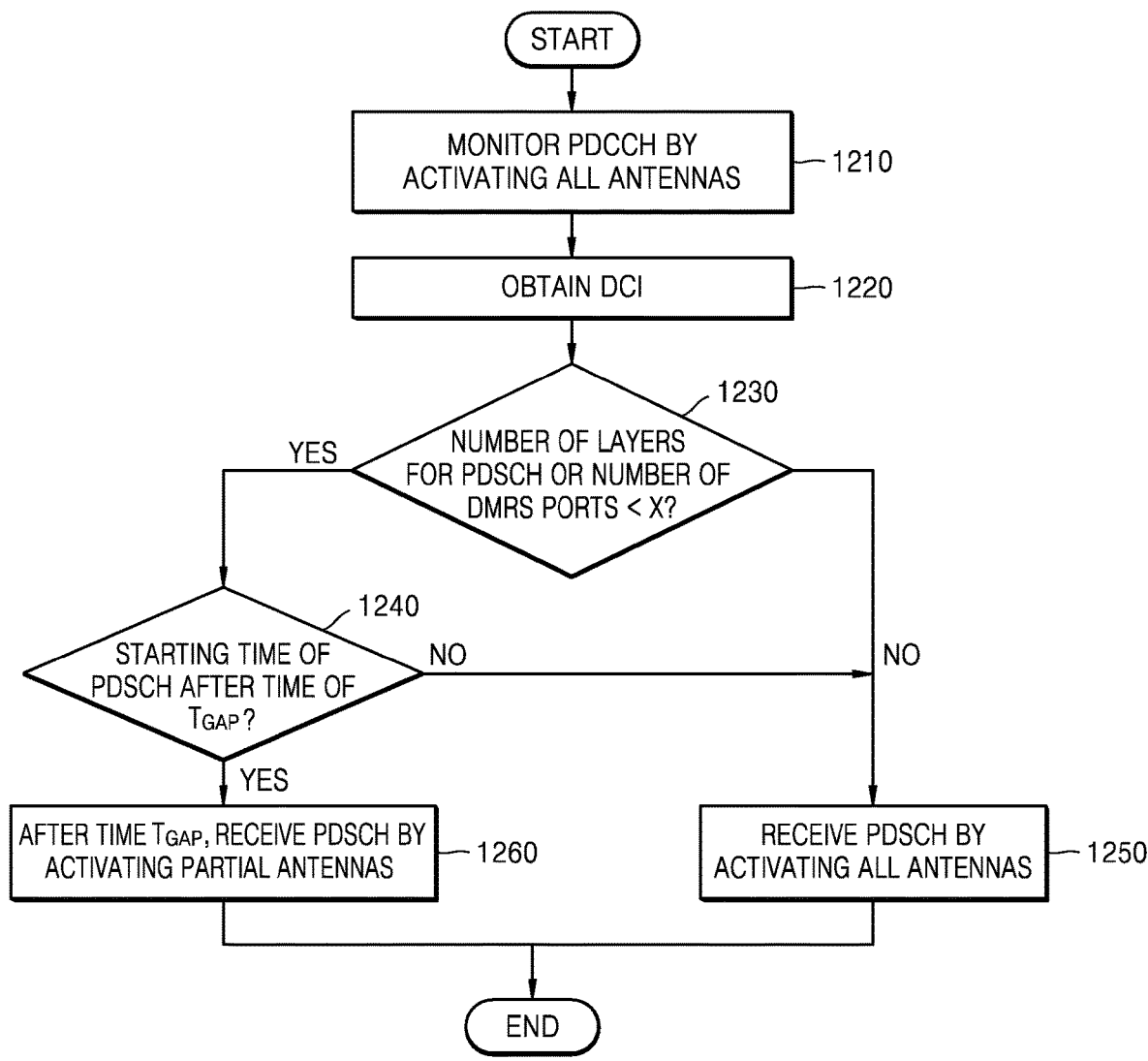
FIG. 12 is a flowchart illustrating a method of reducing power consumption of a terminal in a wireless communication system, according to another embodiment.

FIG. 12 is a flowchart illustrating a method of reducing power consumption of a terminal in a wireless communication system, according to another embodiment.

A terminal may activate all of the antennas (or equally, physical antennas for reception with at least 4 receive antenna ports) to monitor a PDCCH, in operation 1210. Subsequently, the terminal may obtain scheduling DCI for a PDSCH, in operation 1220. In an embodiment, the terminal may receive configuration information about the number of layers or DMRS ports for the PDSCH. For example, the terminal may obtain the following pieces of information as some of the scheduling information for the PDSCH from the DCI.

TABLE 15

| resource allocation information on time axis - 1, 2, 3, or 4 bits (index of slot in which PDSCH is scheduled, starting symbol position, symbol length, PDSCH mapping type, etc.) antenna port information - 4, 5 or 6 bits (number of DMRS CDM groups, DMRS port number, the number of symbols of front-load DMRS, etc.) |
|---|

The terminal may determine whether the number of layers or DMRS ports obtained from antenna port information for the PDSCH is less than X, in operation 1230. X may correspond to a threshold value predefined for determination to activate some of antennas, e.g., X may be 3 or 4.

In a case that the terminal determines that the number of DMRS ports notified in DCI is less than X in operation 1230, the terminal may proceed to operation 1240 to determine whether a time gap between a starting time of the PDSCH obtained from resource allocation information on the time axis for the PDSCH and a time at which a PDCCH is received is greater than $T_{gap}$.

When the terminal determines that the time gap between the starting time of the PDSCH and the time at which the PDCCH is received is greater than $T_{gap}$, the terminal may proceed to operation 1260 to receive the scheduled PDSCH by activating only some of antennas after the time $T_{gap}$.

When the terminal determines that the time gap between the starting time of the PDSCH and the time at which the PDCCH is received is less than $T_{gap}$, the terminal may proceed to operation 1250 to receive the scheduled PDSCH by activating all of the antennas.

When it is determined that the number of DMRS ports is greater than X in operation 1230, the terminal may proceed to operation 1250 to activate all of the antennas and receive the scheduled PDSCH.

Figure 13:
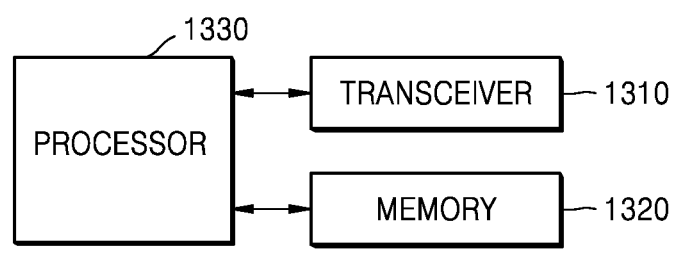
FIG. 13 is a block diagram of an internal structure of a terminal, according to an embodiment.

FIG. 13 is a block diagram of an internal structure of a terminal, according to an embodiment.

Referring to FIG. 13, a terminal 1300 may include a transceiver 1310, a memory 1320, and a processor 1330. The transceiver 1310, the memory 1320, and the processor 1330 of the terminal 1300 may operate according to the aforementioned communication method of the terminal 1300. Elements of the terminal 1300 are not, however, limited thereto. For example, the terminal 1300 may include more or fewer elements than described above. In addition, the transceiver 1310, the memory 1320, and the processor 1330 may be implemented in a single chip.

The transceiver 1310 may transmit or receive signals to or from a base station. The signals may include control information and data. For this, the transceiver 1310 may include an RF transmitter for up-converting the frequency of a signal to be transmitted and amplifying the signal and an RF receiver for low-noise amplifying a received signal and down-converting the frequency of the received signal. It is merely an example of the transceiver 1310, and the elements of the transceiver 1310 are not limited to the RF transmitter and RF receiver.

In addition, the transceiver 1310 may receive a signal on a wireless channel and output the signal to the processor 1330, or transmit a signal output from the processor 1330 on a wireless channel.

The memory 1320 may store a program and data required for operation of the terminal 1300. Furthermore, the memory 1320 may store control information or data included in a signal obtained by the terminal 1300. The memory 1320 may include a storage medium such as a ROM, a RAM, a hard disk, a CD-ROM, and a DVD, or a combination of storage mediums. Moreover, the memory 1320 may be in the plural. In an embodiment, the memory 1320 may store a program to support beam based cooperative communication.

The processor 1330 may control a series of processes for the terminal 1300 to be operated according to the aforementioned embodiments. For example, it may control operations to transmit or receive an up/downlink control channel and a data channel in consideration of a PSR message transmission method, a power saving mode operation method, some of antenna activation method, etc., in accordance with embodiments. The processor 1330 may be in the plural. In an embodiment, the processor 1330 may execute the program stored in the memory 1320 to control a PSR message requesting the power saving mode to be transmitted to the base station and configuration information or indicator information relating to the power saving mode to be received from the base station.

Figure 14:
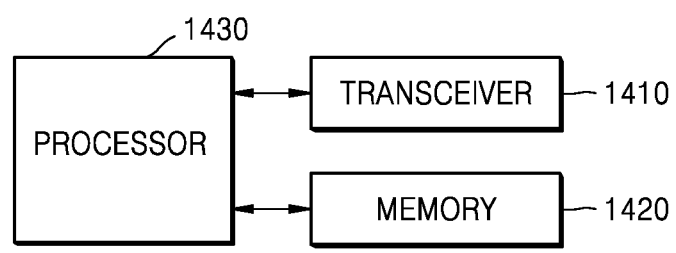
FIG. 14 is a block diagram of an internal structure of a base station, according to an embodiment.

FIG. 14 is a block diagram of an internal structure of a base station, according to an embodiment.

Referring to FIG. 14, a base station 1400 may include a transceiver 1410, a memory 1420, and a processor 1430. The transceiver 1410, the memory 1420, and the processor 1430 of the base station 1400 may operate according to the aforementioned communication method of the base station 1400. Elements of the base station 1400 are not, however, limited thereto. For example, the base station 1400 may include more or fewer elements than described above. In addition, the transceiver 1410, the memory 1420, and the processor 1430 may be implemented in a single chip.

The transceiver 1410 may transmit or receive signals to or from a terminal. The signals may include control information and data. For this, the transceiver 1410 may include an RF transmitter for up-converting the frequency of a signal to be transmitted and amplifying the signal and an RF receiver for low-noise amplifying a received signal and down-converting the frequency of the received signal. It is merely an example of the transceiver 1410, and the elements of the transceiver 1410 are not limited to the RF transmitter and RF receiver.

In addition, the transceiver 1410 may receive a signal on a wireless channel and output the signal to the processor 1430, or transmit a signal output from the processor 1430 on a wireless channel.

The memory 1420 may store a program and data required for operation of the base station 1400. Furthermore, the memory 1420 may store control information or data included in a signal obtained by the base station 1400. The memory 1420 may include a storage medium such as a ROM, a RAM, a hard disk, a CD-ROM, and a DVD, or a combination of storage mediums. Moreover, the memory 1420 may be in the plural. In an embodiment, the memory 1420 may store a program to support beam based cooperative communication.

The processor 1430 may control a series of processes for the base station 1400 to operate in accordance with the embodiments of the present disclosure. For example, it may control operations to transmit or receive an up/downlink control channel and a data channel in consideration of a PSR message transmission resource configuration method, a power saving mode configuration method, a DMRS port number configuration method, etc., in accordance with embodiments of the disclosure. The processor 1330 may be in the plural. In an embodiment, the processor 1430 may execute the program stored in the memory 1420 to control a PSR message requesting the power saving mode to be received from the terminal and configuration information or indicator information relating to the power saving mode to be transmitted to the terminal in response to the PSR message.

Methods according to the claims of the disclosure or the embodiments described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a LAN, a wide LAN (WLAN), or a storage area network (SAN), or a combination thereof. The storage device may be connected to an apparatus performing the embodiments of the disclosure through an external port. Furthermore, an extra storage device in the communication network may access a device that performs the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have been described, but a person of ordinary skill in the art will understand and appreciate that various modifications can be made without departing the scope of the disclosure. Thus, it will be apparent to those ordinary skilled in the art that the disclosure is not limited to the embodiments of the disclosure described, which have been provided only for illustrative purposes. Furthermore, the embodiments may be operated by being combined with one another if necessary. For example, an embodiment of the disclosure and some of another embodiment of the disclosure may be combined to operate the base station and the terminal. The embodiments may be equally applied to other communication systems, and other modifications of the embodiments may also be made without departing from the scope of the disclosure.

The invention claimed is:

1. A terminal capable of power saving in a wireless communication system, comprising:
   a transceiver; and
   at least one processor coupled with the transceiver and configured to:
      identify a configuration for reporting at least one of:
         preference information associated with a maximum bandwidth for power saving, or
         preference information associated with a maximum value of a number of layers for power saving,
      transmit, to a base station (BS), based on the identified configuration for the reporting, a power saving request message including the at least one of the preference information associated with the maximum bandwidth for power saving, or the preference information associated with the maximum value of the number of layers for power saving,
      receive, from the BS, configuration information including a maximum number of layers to be used for Physical Downlink Shared Channel (PDSCH), based on the configuration information, receive, from the BS, the PDSCH using the maximum number of layers or less than the maximum number of layers, and deactivate some of antennas based on a time gap between a time at which the configuration information is received and a starting time at which the PDSCH is received.

2. The terminal of claim 1, wherein the at least one processor is further configured to:
transmit, to the BS, power saving capability information including at least one of capability information to report the preference information associated with the maximum bandwidth for power saving, or capability information to report the preference information associated with the maximum value of the number of layers for power saving.

3. The terminal of claim 2, wherein the power saving capability information further includes an indication for a maximum number of Physical Downlink Control Channel (PDCCH) candidates.

4. The terminal of claim 1,
wherein the power saving request message is transmitted via Remote Radio Control (RRC) signaling; and
wherein the configuration information including the maximum number of layers to be used for PDSCH is transmitted via higher layer signaling.

5. The terminal of claim 1, wherein the at least one processor is further configured to:
receive, from the BS, configuration information associated with the maximum number of layers to be used for Physical Uplink Shared Channel (PUSCH); and
transmit, to the BS, the PUSCH using equal to or less than the maximum number of layers to be used for PUSCH based on the configuration information associated with the maximum number of layers to be used for PUSCH.

6. The terminal of claim 1, wherein the power saving request message further includes at least one of a minimum value of a PDCCH monitoring periodicity, a maximum number of Demodulation Reference Signal (DMRS) ports, or a maximum bandwidth of a bandwidth part.

7. The terminal of claim 1, wherein the at least one processor is further configured to:
identify the time gap between the time at which the configuration information including the maximum number of layers to be used for PDSCH is received and the starting time at which the PDSCH is received,
determine whether the time gap is greater than a transition time required to deactivate some of the antennas based on the maximum number of layers to be used for PDSCH,
when the time gap is greater than the transition time, deactivate some of the antennas based on the maximum number of layers to be used for PDSCH and receive the PDSCH using antennas except for the deactivated antennas, and
when the time gap is smaller than the transition time, receive the PDSCH using all of the antennas.

8. A base station (BS) for power saving in a wireless communication system, comprising:
a transceiver; and
at least one processor coupled with the transceiver and configured to:
in case that a configuration for reporting at least one preference information is identified at a terminal, receive, from the terminal, a power saving request message including at least one of:
preference information associated with a maximum bandwidth for power saving, or
preference information associated with a maximum value of a number of layers for power saving,
transmit, to the terminal, configuration information including a maximum number of layers to be used for Physical Downlink Shared Channel (PDSCH),
based on the configuration information, transmit, to the terminal, the PDSCH using the maximum number of layers or less than the maximum number of layers,
wherein some of antennas of the terminal are deactivated based on a time gap between a time at which the configuration information is received at the terminal and a starting time at which the PDSCH is received at the terminal.

9. The BS of claim 8, wherein the at least one processor is further configured to:
receive, from the terminal, power saving capability information including at least one of capability information to report the preference information associated with the maximum bandwidth for power saving or capability information to report the preference information associated with the maximum value of the number of layers for power saving.

10. The BS of claim 9, wherein the power saving capability information further includes an indication for a maximum number of Physical Downlink Control Channel (PDCCH) candidates.

11. The BS of claim 8,
wherein the power saving request message is transmitted via Remote Radio Control (RRC) signaling; and
wherein the configuration information including the maximum number of layers to be used for PDSCH is transmitted via higher layer signaling.

12. The BS of claim 8, wherein the at least one processor is further configured to:
transmit, to the terminal, configuration information associated with the maximum number of layers to be used for Physical Uplink Shared Channel (PUSCH) based on the power saving request message, and
receive, from the terminal, the PUSCH using equal to or less than the maximum number of layers to be used for PUSCH based on the configuration information associated with the maximum number of layers to be used for PUSCH.

13. The BS of claim 8, wherein the power saving request message further includes at least one of a minimum value of a PDCCH monitoring periodicity, a maximum number of Demodulation Reference Signal (DMRS) ports, or a maximum bandwidth of a bandwidth part.

14. A method performed by a terminal capable of power saving in a wireless communication system, comprising:
identifying a configuration for reporting at least one of:
preference information associated with a maximum bandwidth for power saving or preference information associated with a maximum value of a number of layer for power saving;
transmitting, to a base station (BS) based on the identified configuration for the reporting, a power saving request message including the at least one of: the preference information associated with the maximum bandwidth for power saving or the preference information associated with the maximum value of the number of layers for power saving;
receiving, from the BS, configuration information including a maximum number of layers to be used for Physical Downlink Shared Channel (PDSCH);

based on the configuration information, receiving, from the BS, the PDSCH using the maximum number of layers or less than the maximum number of layers, and deactivating some of antennas based on a time gap between a time at which the configuration information is received and a starting time at which the PDSCH is received.

15. The method of claim 14, further comprising:

transmitting, to the BS, power saving capability information including at least one of capability information to report the preference information associated with the maximum bandwidth for power saving or capability information to report the preference information associated with the maximum value of the number of layers for power saving.

16. The method of claim 14, wherein the power saving capability information further includes an indication for a maximum number of Physical Downlink Control Channel (PDCCH) candidates.

17. The method of claim 14, wherein the power saving request message is transmitted via Remote Radio Control (RRC) signaling; and wherein the configuration information including the maximum number of layers to be used for PDSCH is transmitted via higher layer signaling.

18. The method of claim 14, further comprising:

receiving, from the BS, configuration information associated with the maximum number of layers to be used for Physical Uplink Shared Channel (PUSCH); and transmitting, to the BS, the PUSCH using equal to or less than the maximum number of layers to be used for PUSCH based on the configuration information associated with the maximum number of layers to be used for PUSCH.

19. The method of claim 14, wherein the power saving request message further includes at least one of a minimum value of a PDCCH monitoring periodicity, a maximum number of Demodulation Reference Signal (DMRS) ports, or a maximum bandwidth of a bandwidth part.

20. The method of claim 14, further comprising:

identifying the time gap between the time at which the configuration information including the maximum number of layers to be used for PDSCH is received and the starting time at which the PDSCH is received;

determining whether the time gap is greater than a transition time required to deactivate some of the antennas based on the maximum number of layers to be used for PDSCH;

when the time gap is greater than the transition time, deactivating some of the antennas based on the maximum number of layers to be used for PDSCH and receiving the PDSCH using antennas except for the deactivated antennas; and when the time gap is smaller than the transition time, receiving the PDSCH using all of the antennas.

* * * * *